US008875497B2

(12) United States Patent
Matsunaga et al.

(10) Patent No.: US 8,875,497 B2
(45) Date of Patent: Nov. 4, 2014

(54) EXHAUST PURIFICATION SYSTEM FOR INTERNAL COMBUSTION ENGINE

(75) Inventors: Hideki Matsunaga, Saitama (JP); Yuji Yasui, Saitama (JP); Eiji Hashimoto, Saitama (JP); Hisao Haga, Saitama (JP); Naohiro Sato, Saitama (JP); Masafumi Sakota, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 238 days.

(21) Appl. No.: 13/439,434

(22) Filed: Apr. 4, 2012

(65) Prior Publication Data

US 2012/0255286 A1    Oct. 11, 2012

(30) Foreign Application Priority Data

Apr. 5, 2011    (JP) .................................. 2011-083960

(51) Int. Cl.
*F01N 3/00*    (2006.01)
*F01N 3/10*    (2006.01)
(Continued)

(52) U.S. Cl.
CPC ............ *F02D 41/0055* (2013.01); *Y02T 10/24* (2013.01); *Y02T 10/47* (2013.01); *F01N 3/106* (2013.01); *F01N 2370/04* (2013.01); *F01N 13/0097* (2013.01); *F01N 3/208* (2014.06); *F02D 2041/1468* (2013.01); *F01N 3/0814* (2013.01); *B01D 53/9418* (2013.01); *B01D 2255/912* (2013.01); *B01D 2255/50* (2013.01); *F02D 41/1446* (2013.01); *F01N 2560/026* (2013.01); *F02D 2200/0806* (2013.01); *F02D 41/10* (2013.01); *F02D 2200/0802* (2013.01); *F02D 41/146* (2013.01); *B01D 53/944* (2013.01); *F02D 41/0275* (2013.01); *B01D 2255/91* (2013.01); *F01N 13/009* (2014.06); *F01N 2570/14* (2013.01); *B01D 53/9477* (2013.01); *F01N 3/2066* (2013.01)
USPC .................. 60/295; 60/285; 60/286; 60/301; 60/303

(58) Field of Classification Search
CPC ....... F01N 3/106; F01N 3/2066; F01N 3/208; F01N 2560/026; F01N 2570/14; F01N 2610/02; F02D 41/146; F02D 2200/0806; Y02T 10/47
USPC ............ 60/285, 286, 287, 295, 299, 301, 303
See application file for complete search history.

(56) References Cited

U.S. PATENT DOCUMENTS

2010/0139250 A1* 6/2010 Andersson et al. ............. 60/285
2011/0000189 A1* 1/2011 Mussmann et al. ............. 60/274
(Continued)

FOREIGN PATENT DOCUMENTS

JP    2008-231950 A    10/2008

OTHER PUBLICATIONS

Notice of Reasons for Rejection issued in DE Application No. 102012205736.6, mailed Jul. 31, 2012.
(Continued)

*Primary Examiner* — Audrey K Bradley
(74) *Attorney, Agent, or Firm* — Squire Patton Boggs (US) LLP

(57) ABSTRACT

An exhaust purification system for an internal combustion engine is provided that can steadily maintain a NOx purification rate of a selective reduction catalyst to be high without allowing the fuel economy or marketability to deteriorate. The exhaust purification system includes a $NO_2$—NOx ratio adjustment mechanism that causes a $NO_2$—NOx ratio to change; and a $NO_2$—NOx ratio perturbation controller that executes $NO_2$—NOx ratio perturbation control so that a $NO_2$ balance of the selective reduction catalyst in a predetermined time period, with $NO_2$ adsorption being positive and $NO_2$ release being negative, is 0. Herein, $NO_2$—NOx ratio perturbation control is defined as control that alternately executes $NO_2$ increase control to cause the $NO_2$—NOx ratio to be greater than a reference value near 0.5, and $NO_2$ decrease control to cause the $NO_2$—NOx ratio to be less than the reference value.

15 Claims, 20 Drawing Sheets

(51) Int. Cl.

| | |
|---|---|
| *F01N 13/00* | (2010.01) |
| *F01N 3/20* | (2006.01) |
| *F02D 41/00* | (2006.01) |
| *F01N 3/08* | (2006.01) |
| *F02D 41/10* | (2006.01) |
| *F02D 41/14* | (2006.01) |
| *B01D 53/94* | (2006.01) |
| *F02D 41/02* | (2006.01) |

(56) References Cited

U.S. PATENT DOCUMENTS

2011/0041481 A1   2/2011   Fujita
2012/0186226 A1*  7/2012   Ren et al. .................. 60/274

OTHER PUBLICATIONS

Office Action mailed Jan. 30, 2013 in DE Patent Application No. 102012205736.6.

\* cited by examiner

EXHAUST PURIFICATION SYSTEM FOR INTERNAL COMBUSTION ENGINE

This application is based on and claims the benefit of priority from Japanese Patent Application No. 2011-083960, filed on 5 Apr. 2011, the content of which is incorporated herein by reference.

BACKGROUND OF THE INVENTION

1. Field of the Invention

The present invention relates to an exhaust purification system for an internal combustion engine. More specifically, it relates to an exhaust purification system for an internal combustion engine equipped with a selective reduction catalyst that selectively reduces nitrogen oxides (NOx) in the exhaust under the presence of a reducing agent.

2. Related Art

As one exhaust purification system that purifies NOx in exhaust, a system has thus far been proposed in which a selective reduction catalyst that selectively reduces NOx in the exhaust by way of a reducing agent such as ammonia ($NH_3$) is provided in an exhaust channel. For example, with an exhaust purification system of urea addition type, urea water, which is a $NH_3$ precursor, is supplied from an upstream side of the selective reduction catalyst, $NH_3$ is generated by thermal decomposition or hydrolysis of this urea water by the heat of the exhaust, and the NOx in the exhaust is selectively reduced by this $NH_3$. In addition to such a system of urea addition type, for example, a system has also been proposed that generates $NH_3$ by heating a compound of $NH_3$ such as ammonia carbide, and directly adds this $NH_3$. A system of urea addition type will be explained hereinafter.

The NOx purification rate of the selective reduction catalyst is known to change depending on the proportions of nitric monoxide (NO) and nitrogen dioxide ($NO_2$) constituting the NOx of the exhaust flowing thereinto. More specifically, when the $NO_2$—NOx ratio of the exhaust flowing into the selective reduction catalyst (mole ratio of $NO_2$ to NOx, which combines NO and $NO_2$) is 0.5, i.e. when the ratio of NO to $NO_2$ is 1:1, the NOx purification rate is a maximum.

An exhaust purification device is proposed in Japanese Unexamined Patent Application Publication No. 2008-231950 (hereinafter referred to as "Patent Document 1") that is configured such that the $NO_2$—NOx ratio of the exhaust flowing into the selective reduction catalyst is 0.5 in order to maximize the performance of such a selective reduction catalyst. With this exhaust purification device, it is configured such that the $NO_2$—NOx ratio of the exhaust flowing into the selective reduction catalyst is always maintained at 0.5 by controlling an EGR amount, fuel injection timing, etc. in a feed-forward manner by searching a map established in advance, based on the operating state of the internal combustion engine.

SUMMARY OF THE INVENTION

However, although the operating state of an internal combustion engine is always changing depending on the demands of the operator, the state of the vehicle, etc., continuously maintaining the $NO_2$—NOx ratio at 0.5 under such conditions is very difficult in actual practice. For example, in a case of providing an oxidation catalyst that oxidizes NO to $NO_2$ on the upstream side of the selective reduction catalyst, the $NO_2$—NOx ratio of the exhaust flowing into the selective reduction catalyst will change depending on the temperature of the oxidation catalyst, space velocity (SV) of the exhaust in the oxidation catalyst, NOx amount, $O_2$ concentration and HC concentration in the exhaust flowing into the oxidation catalyst, etc.; however, these parameters cannot be mapped in all operating regions so that the $NO_2$—NOx ratio is 0.5.

In addition, even if it were assumed that such mapping were possible, in this case, deterioration of the fuel economy and marketability could not be avoided. For example, since the NOx purification rate of the selective reduction catalyst changes depending on the temperature thereof, temperature control to maintain at a suitable temperature is performed by causing the exhaust temperature to rise. Herein, the change in energy required in the above-mentioned temperature control when causing the $NO_2$—NOx ratio to decline from a state being at 0.7 to the optimum of 0.5 will be considered. For example, if trying to make the SV of the exhaust flowing into the oxidation catalyst increase in order to make the $NO_2$—NOx ratio decline, in this case, the temperature of the exhaust flowing into the selective reduction catalyst will also decline; therefore, the energy required in temperature control increases. In addition, if trying to make the NOx amount in the exhaust flowing into the oxidation catalyst to increase in order to make the $NO_2$—NOx ratio decline, in this case, the consumed amount of reducing agent in the selective reduction catalyst may increase.

As described above, control to continuously maintain the $NO_2$—NOx ratio at the optimum value such as that of the technology illustrated in Patent Document 1 is not only difficult in actual practice, but also cannot avoid deterioration in the fuel economy and marketability even if it were possible.

The present invention has been made taking the aforementioned issues into account, and has an object of providing an exhaust purification system for an internal combustion engine that can steadily maintain the NOx purification rate of the selective reduction catalyst to be high, without causing deterioration in the fuel economy or marketability.

In order to achieve the above-mentioned object, the present invention provides an exhaust purification system (e.g., the exhaust purification system 2 described later) for an internal combustion engine (e.g., the engine 1 described later) including: a NOx selective reduction catalyst (e.g., the selective reduction catalyst 23 described later) provided in an exhaust channel (e.g., the exhaust plumbing 11 described later) of the internal combustion engine, and having a function of selectively reducing NOx in exhaust under the presence of a reducing agent (e.g., the $NH_3$ described later), and adsorbing $NO_2$ in the exhaust. The exhaust purification system includes: a $NO_2$—NOx ratio adjustment mechanism (e.g., the engine 1, oxidation catalyst 21, CSF 22, high-pressure EGR device 26, etc. described later) that causes a $N_2$—NOx ratio corresponding to a ratio of $NO_2$ to NOx in exhaust flowing into the NOx selective reduction catalyst to change; and a perturbation control means or unit (e.g., the $NO_2$—NOx ratio perturbation controller 61 and main controller 7 described later) for executing $NO_2$—NOx ratio perturbation control so that a $NO_2$ balance of the NOx selective reduction catalyst in a predetermined time period, with $NO_2$ adsorption being positive and $NO_2$ release being negative, is a target value. The $NO_2$—NOx ratio perturbation control is defined as control that alternately executes $NO_2$ increase control to cause the $NO_2$—NOx ratio to be greater than a reference value near 0.5 by way of the $NO_2$—NOx ratio adjustment mechanism, and $NO_2$ decrease control to cause the $NO_2$—NOx ratio to be less than the reference value by way of the $NO_2$—NOx ratio adjustment mechanism.

Conventionally, the steady NOx purification rate of a NOx selective reduction catalyst reaches a maximum when the $NO_2$—NOx ratio of the exhaust flowing thereinto is at a reference value near 0.5, and the steady NOx purification rate thereof has declined regardless of whether the $NO_2$—NOx ratio changes to the $NO_2$ excessive side or NO excessive side. In contrast, in a case of there being a function of adsorbing $NO_2$ in the NOx selective reduction catalyst, $NO_2$ is adsorbed or released as if to maintain the $NO_2$—NOx ratio at the optimum value, even if the $NO_2$—NOx ratio were to greatly change from the above-mentioned reference value to the $NO_2$ excessive side or NO excessive side; therefore, the transient NOx purification rate is maintained to be high while the amount of $NO_2$ adsorbing to the NOx selective reduction catalyst is maintained within a suitable range.

The present invention focuses on the novel characteristics of such a NOx selective reduction catalyst, and executes $NO_2$—NOx ratio perturbation control so that the $NO_2$ balance of the NOx selective reduction catalyst in a predetermined period is a target value. In other words, $NO_2$ increase control to make the $NO_2$—NOx ratio of the exhaust flowing into the NOx selective reduction catalyst larger than the reference value, and $NO_2$ decrease control to contrarily make the $NO_2$—NOx ratio less than the reference value are alternately executed. It is thereby possible to steadily maintain the NOx purification rate of the NOx selective reduction catalyst to be high.

In addition, in the $NO_2$—NOx ratio perturbation control of the present invention, since the $NO_2$—NOx ratio is made to change to be above or below the above-mentioned reference value so that the $NO_2$ balance in a predetermined period is a target value, compared to the conventional technology that performs control to fit the $NO_2$—NOx ratio to the optimum value, it is possible to impart a large degree of freedom to the variation pattern of the $NO_2$—NOx ratio in the above-mentioned predetermined period. As a result, variation in the $NO_2$—NOx ratio by other factors can be permitted to some extent; therefore, the fuel economy and marketability will not deteriorate as with the conventional technology.

In addition, with the present invention, the reference value for the $NO_2$—NOx ratio is set to a value near 0.5, i.e. within a range having a certain span including 0.5. The $NO_2$—NOx ratio at which the steady NOx purification rate is the highest is basically 0.5. However, since the $NO_2$—NOx ratio flowing into the selective reduction catalyst changes depending on the state of the selective reduction catalyst, state of the exhaust flowing into the selective reduction catalyst, and the like, more specifically, the amount of HC adhered to the selective reduction catalyst and the amount of $NO_2$ reduction components such as HC and CO in the exhaust flowing into the selective reduction catalyst, the $NO_2$—NOx ratio at which the steady NOx purification rate is a maximum also changes substantially. In the present invention, the above-mentioned reference value is set not to a constant of 0.5, but rather to values in the vicinity of 0.5, expecting instability in such states of the selective reduction catalyst and exhaust. It should be noted that the above-mentioned reference value tends to fluctuate more towards larger than 0.5 due to the existence of the aforementioned such $NO_2$ reduction components; therefore, the value near 0.5 in the present invention is set to more specifically be within the range of at least 0.4 and less than 0.7.

In this case, it is preferable for the exhaust purification system to further include a $NO_2$ adsorption amount estimation means (e.g., the selective reduction catalyst state estimation means 54 described later) for estimating a $NO_2$ adsorption amount of the NOx selective reduction catalyst, in which the perturbation control means sets a value of a control parameter (the target value of the $NO_2$—NOx ratio, target value of the $NO_2$ balance, waveform pattern, etc. described later) related to execution of the $NO_2$—NOx ratio perturbation control based on the $NO_2$ adsorption amount.

The $NO_2$ adsorption amount of the NOx selective reduction catalyst always changes depending on the operating state of the internal combustion engine. In addition, in a case of providing an oxidation catalyst for purifying CO and HC in the exhaust on an upstream side of the NOx selective reduction catalyst, the HC may flow into the NOx selective reduction catalyst depending on the state of this oxidation catalyst. The adsorbed $NO_2$ will be reduced in a case of HC having flowed into the NOx selective reduction catalyst; therefore, the $NO_2$ adsorption amount will change. Therefore, it is possible to understand such a change in $NO_2$ adsorption amount from only the $NO_2$—NOx ratio of the exhaust flowing into the selective reduction catalyst. Consequently, in the present invention, it is possible to execute $NO_2$—NOx ratio perturbation control so that the $NO_2$ balance in a predetermined period is a more appropriate target value, by way of setting the value of a control parameter related to the execution of $NO_2$—NOx ratio perturbation control based on the estimated $NO_2$ adsorption amount.

In this case, it is preferable for the exhaust purification system to further include a $NO_2$ detection means or device (e.g., the $NO_2$ sensor described later) for detecting a $NO_2$ concentration of exhaust on a downstream side of the NOx selective reduction catalyst, in which the perturbation control means sets a value of a control parameter related to execution of the $NO_2$—NOx ratio perturbation control based on an output value of the $NO_2$ detection means.

When the $NO_2$ adsorption amount of the NOx selective reduction catalyst approaches the permitted amount thereof, $NO_2$ that could not be adsorbed is discharged from the selective reduction catalyst; therefore, although it cannot be precisely understood up to the absolute value of the $NO_2$ adsorption amount by using the aforementioned such $NO_2$ detection means, it is possible to determine at least whether the $NO_2$ adsorption amount is near the permitted amount. Therefore, by setting the value of the control parameter related to execution of the $NO_2$—NOx ratio perturbation control based on the output value of such a $NO_2$ detection means, it is possible to execute $NO_2$—NOx ratio perturbation control so that the $NO_2$ balance in a predetermined period is a more appropriate target value.

In this case, it is preferable for the exhaust purification system to further include: a NOx detection means or device (e.g., the NOx sensor described later) for detecting a NOx concentration of exhaust on a downstream side of the NOx selective reduction catalyst; and a $NO_2$ adsorption amount estimation means or unit (e.g., the selective reduction catalyst state estimation unit 54 described later) for estimating a $NO_2$ adsorption amount of the NOx selective reduction catalyst based on the output value of the $NO_2$ detection means or device and an output value of the NOx detection means or device, in which the perturbation control means or unit sets a value of the control parameter based on the $NO_2$ adsorption amount.

With the present invention, it is possible to execute $NO_2$—NOx ratio perturbation control so that the $NO_2$ balance is a more appropriate target value in a predetermined period as described above, by estimating the $NO_2$ adsorption amount of the NOx selective reduction catalyst based on the output values of the $NO_2$ detection means and NOx detection means, and further setting the value of the control parameter related to execution of $NO_2$—NOx ratio perturbation control based on this estimated $NO_2$ adsorption amount.

In this case, it is preferable for the perturbation control means to set the target value for the $NO_2$ balance so that the $NO_2$ adsorption amount is maintained within a NOx slip suppression range established between a predetermined upper limit and lower limit. Herein, $NO_2$ slip occurs when supplying $NO_2$ excessive exhaust in a state in which the $NO_2$ adsorption amount is greater than the upper limit, and NO slip occurs when supplying NO excessive exhaust in a state in which the $NO_2$ adsorption amount is less than the lower limit.

In the case of there being a function of adsorbing $NO_2$ in the NOx selective reduction catalyst, for the transient NOx purification rate, the robustness to change to the $NO_2$ excessive side of the $NO_2$—NOx ratio declines when the $NO_2$ adsorption amount approaches the permitted amount, and the robustness to change to the NO excessive side of the $NO_2$—NOx ratio declines when the $NO_2$ adsorption amount approaches 0. As a result, it is preferable for the $NO_2$ adsorption amount of the NOx selective reduction catalyst to be maintained within a suitable range as described above. Therefore, with the present invention, the NOx slip suppression range defined by the aforementioned such adsorption upper limit and adsorption lower limit for the $NO_2$ adsorption amount is established, and the target value for the $NO_2$ balance in a predetermined period is set so that the $NO_2$ adsorption amount is maintained within this NOx slip suppression range. Since it is thereby possible to maintain the NOx selective reduction catalyst in a state with high robustness to change in the $NO_2$—NOx ratio to both the $NO_2$ excessive side and NO excessive side, the NOx purification rate can be steadily maintained to be high.

In this case, it is preferable for the perturbation control means to: set a target value of the $NO_2$ balance to 0 or the vicinity thereof in a case of the $NO_2$ adsorption amount being within the NOx suppression slip range; set the target value of the $NO_2$ balance to negative so that the $NO_2$ adsorption amount decreases in a case of the $NO_2$ adsorption amount being greater than an upper limit of the NOx slip suppression range; and set the target value of the $NO_2$ balance to positive so that the $NO_2$ adsorption amount increases in a case of the $NO_2$ adsorption amount being less than a lower limit of the NOx slip suppression range.

With the present invention, in a case of the $NO_2$ adsorption amount being within the NOx slip suppression range, the target value of the $NO_2$ balance in the above-mentioned predetermined period is set to 0 or the vicinity thereof to decrease the amount of change in the $NO_2$ adsorption amount. Then, in a case of the $NO_2$ adsorption amount being larger than the upper limit of the NOx slip suppression range, the target value of the $NO_2$ balance is set to negative so that the $NO_2$ adsorption amount decreases, and in a case of the $NO_2$ adsorption amount being smaller than the lower limit of the NOx slip suppression range, the target value of the $NO_2$ balance is set to positive so that the $NO_2$ adsorption amount increases. Since it is thereby possible to maintain the NOx selective reduction catalyst in a state with high robustness to change in the $NO_2$—NOx ratio to both the $NO_2$ excessive side and NO excessive side, the NOx purification rate can be steadily maintained to be high.

In this case, it is preferable for the perturbation control means to set the value of the control parameter so that the $NO_2$ increase control is preferentially executed over the $NO_2$ decrease control with an increase in an amount of a $NO_2$ reduction component discharged from the internal combustion engine and flowing into the NOx selective reduction catalyst.

$NO_2$ reduction components such as HC and CO are discharged from the internal combustion engine. Usually, these $NO_2$ reduction components are oxidized by the oxidation catalyst provided immediately following the internal combustion engine, for example; however, depending on the state of this oxidation catalyst, some may flow into the selective reduction catalyst. When such $NO_2$ reduction components flow into the selective reduction catalyst and adhere thereto, the $NO_2$ is reduced; therefore, the $NO_2$ adsorption amount gradually decreases. Therefore, with the present invention, by setting the value of the control parameter so that the $NO_2$ increase control is more preferentially executed over $NO_2$ decrease control as the $NO_2$ reduction components flowing into the selective reduction catalyst become abundant, it is possible to control the $NO_2$ balance in a predetermined period to a more appropriate target value while supplementing for a decline in the $NO_2$ adsorption amount due to the influx of $NO_2$ reduction component.

In this case, it is preferable for the perturbation control means to correct a reference value for the $NO_2$—NOx ratio to a larger value with an increase in an amount of a $NO_2$ reduction component discharged from the internal combustion engine and flowing into the NOx selective reduction catalyst.

With the present invention, by correcting the reference value for the $NO_2$—NOx ratio to a larger value as the $NO_2$ reduction component flowing into the selective reduction catalyst becomes abundant, it is possible to control the $NO_2$ balance in a predetermined period to a more appropriate target value while supplementing for a decline in the $NO_2$ adsorption amount due to the influx of $NO_2$ reduction component.

In this case, it is preferable for the perturbation control means to interrupt execution of the $NO_2$—NOx ratio perturbation control in a case of the internal combustion engine being in an acceleration operating state.

During acceleration operation, the intake air is controlled to the increasing side and the EGR is controlled to the decreasing side; therefore, the NOx amount discharged from the internal combustion engine increases and the SV also increases. Therefore, in a case of the internal combustion engine being in an acceleration operating state, since the $NO_2$—NOx ratio of the exhaust flowing into the selective reduction catalyst comes to change to the NO excessive side, it is not necessary to execute $NO_2$—NOx ratio perturbation control. In addition, when executing perturbation control in such a period, in a case of a request for acceleration from the operator and a request from perturbation control interfering, for example, in a case in which a decrease in the $NO_2$—NOx ratio is further request from perturbation control in a state in which acceleration is being requested by the operator, there is also concern over the $NO_2$—NOx ratio greatly declining more than necessary, and the NOx purification rate declining. Moreover, when executing $NO_2$—NOx ratio perturbation control in such a period, suitable acceleration in response to the request of the operator may not be obtained. Furthermore, from the viewpoint of simplification of the control block, it is preferable to interrupt execution of the $NO_2$—NOx ratio perturbation control in a case of the engine being in an acceleration operating state.

In this case, it is preferable for an oxidation catalyst (e.g., the oxidation catalyst 21, CSF 22, etc. described later) to be provided in the exhaust channel on an upstream side of the NOx selective reduction catalyst, in which the perturbation control means inhibits execution of the $NO_2$—NOx ratio perturbation control in a case of the oxidation catalyst not having reached activation.

In a case of the oxidation catalyst not reaching activation, the NO oxidation efficiency of the oxidation catalyst is low, and upon executing $NO_2$—NOx ratio perturbation control, it is considered not possible to cause the $NO_2$—NOx ratio to change in accordance with the request. In addition, in a case of this oxidation catalyst not having reached activation, it is considered to be a state in which not only the NO oxidation efficiency declines, but also the CO and HC oxidation efficiency declines, and the engine is in warm up; therefore, there is concern over the purification efficiency other than for NOx, such as CO and HC, and the fuel economy also deteriorating if executing perturbation control in such a period. Based on the above, in a case in which the oxidation catalyst has not reached activation, along with inhibiting execution of $NO_2$—NOx ratio perturbation control, it is preferable to prioritize warm up of the oxidation catalyst and internal combustion engine.

In this case, it is preferable for the NOx selective reduction catalyst to contain zeolite having a function of adsorbing $NO_2$ and a function of adsorbing HC.

The HC that is the $NO_2$ reduction component as described above reduces $NO_2$ in the NOx selective reduction catalyst to make NO; which means that there being a function of adsorbing HC in the NOx selective reduction catalyst is considered almost synonymous with improving the $NO_2$ adsorption function of the NOx selective reduction catalyst. Therefore, in $NO_2$—NOx ratio perturbation control, the region in which the $NO_2$—NOx ratio can be made to change can be widened; therefore, the NOx purification rate can be more steadily maintained to be high.

DETAILED DESCRIPTION OF THE INVENTION

First Embodiment

Figure 1:
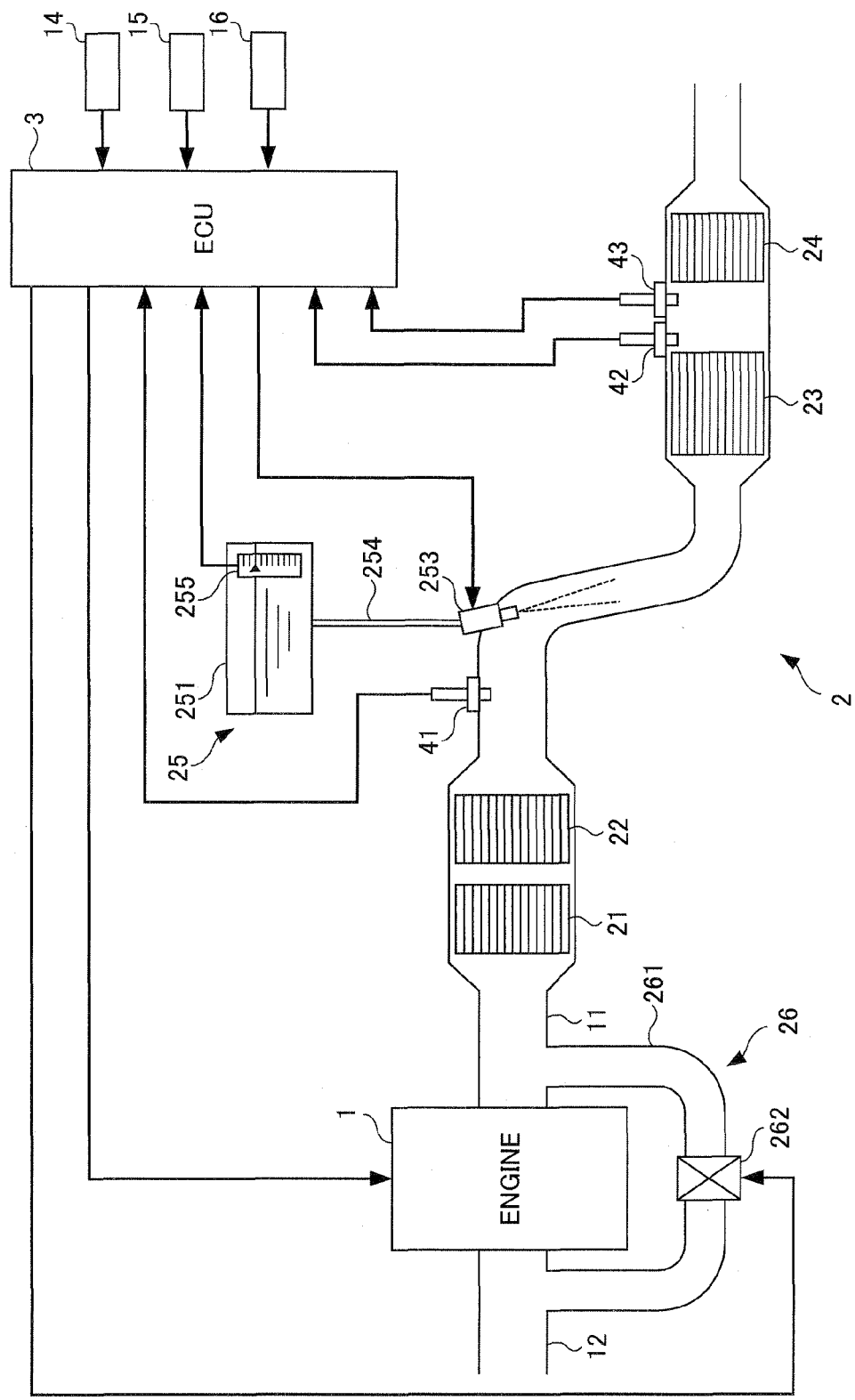
FIG. 1 is a schematic diagram showing the configurations of an engine and an exhaust purification system thereof according to a first embodiment of the present invention.

Hereinafter, a first embodiment of the present invention will be explained while referring to the drawings. FIG. 1 is a schematic diagram showing the configuration of an internal combustion engine (hereinafter referred to as "engine") 1 and an exhaust purification system 2 thereof according to the present embodiment. The engine 1 is a gasoline engine of lean-burn operating type or a diesel engine, and is mounted in a vehicle, which is not illustrated.

The exhaust purification system 2 is configured to include an oxidation catalyst 21 provided in exhaust plumbing 11 of the engine 1, a CSF (Catalyzed Soot Filter) 22 that is provided in the exhaust plumbing 11 and collects soot in the exhaust, a selective reduction catalyst 23 that is provided in an exhaust plumbing 11 and purifies NOx in the exhaust flowing through this exhaust plumbing 11 under the presence of $NH_3$ serving as a reducing agent, a urea injection device 25 that supplies urea water, which is a precursor of ammonia, into the exhaust plumbing 11 on an upstream side of the selective reduction catalyst 23, a high-pressure EGR device 26 that recirculates a portion of the exhaust flowing through the exhaust plumbing 11 into intake plumbing 12, and an electronic control unit (hereinafter referred to as "ECU") 3.

The high-pressure EGR device 26 is configured to include a high-pressure EGR channel 261, and a high-pressure EGR valve 262. The high-pressure EGR channel 261 connects the exhaust plumbing 11 on an upstream side of the oxidation catalyst 21 and the intake plumbing 12. The high-pressure EGR valve 262 is provided in the high-pressure EGR channel 261, and controls the amount of exhaust recirculated through this high-pressure EGR channel 261 (hereinafter referred to as "EGR amount"). This high-pressure EGR valve 262 is connected to the ECU 3 via an actuator that is not illustrated, and the aperture thereof (lift amount) is electromagnetically controlled by the ECU 3.

The oxidation catalyst 21 is provided in the exhaust plumbing 11 immediately after the engine 1 and further upstream than the CSF 22, and in addition to oxidizing and purifying HC and CO in the exhaust, oxidizes the NO in the exhaust to convert to $NO_2$.

Figure 2:
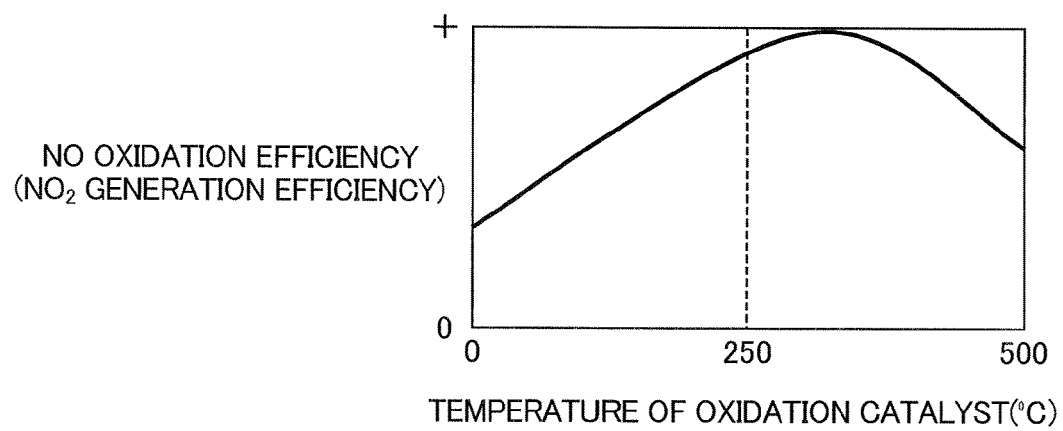
FIG. 2 is a graph showing a relationship between the temperature of an oxidation catalyst and the NOx purification efficiency of the oxidation catalyst.

FIG. 2 is a graph showing a relationship between the temperature of the oxidation catalyst and the NO oxidation efficiency of the oxidation catalyst. Herein, NO oxidation efficiency refers to the proportion of the $NO_2$ amount oxidized by the oxidation catalyst and flowing out thereof relative to the NO amount flowing into the oxidation catalyst, and thus can also be referred to as $NO_2$ generation efficiency. As shown in FIG. 2, the NO oxidation efficiency of the oxidation catalyst exhibits an upward convex characteristic relative to the temperature of the oxidation catalyst, and is configured so as to oxidize NOx in the vicinity of 300° C. with the best efficiency in the example shown in FIG. 2. In other words, the NO oxidation efficiency of the oxidation catalyst declines when the temperature of the oxidation catalyst falls below the optimum value (300° C. in the example of FIG. 2), and declines also if increased above the optimum value. In contrast, it should be noted that the oxidation efficiencies of CO and HC in the oxidation catalyst have characteristics of basically rising along with the temperature of the oxidation catalyst. In other words, the oxidation efficiencies of CO and HC increase with an increase in the temperature of the oxidation catalyst.

Referring back to FIG. 1, the CSF 22 is provided in the exhaust plumbing 11 further downstream than the oxidation catalyst 21 and further upstream than the selective reduction catalyst 23. The CSF 22 collects soot in which carbon in the exhaust is a main component, when the exhaust passes through the fine pores in the filter walls thereof, by causing the soot to deposit on the surface of the filter walls and in the pores in the filter walls. In addition, since the oxidation catalyst is coated on these filter walls, it has a function of oxidizing CO, HC and NO in the exhaust, similarly to the aforementioned oxidation catalyst 21.

It should be noted that the function may be shared between the upstream side and the downstream side, by using catalysts differing in noble metal composition in the oxidation catalyst 21 on the upstream side and in the CSF 22 on the downstream side. For example, by using a catalyst in which Pt and Pd are mixed in the oxidation catalyst 21 on the upstream side, the oxidation performance for HC and CO while at low temperature will be improved, and by using a catalyst in which Pt is the main constituent as well as mixing a small amount of Pd in the CSF 22 on the downstream side, the NO oxidation performance (i.e. $NO_2$ generation performance) can be improved.

Figure 3:
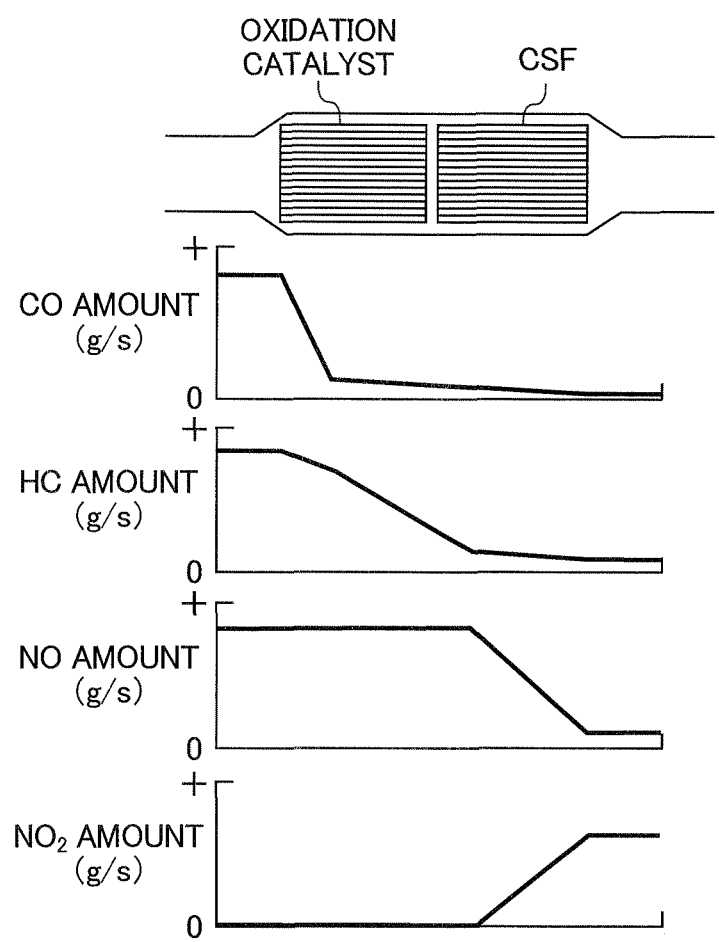
FIG. 3 provides graphs showing the CO amount, HC amount, NO amount and $NO_2$ amount at each part of the oxidation catalyst and CSF.

FIG. 3 provides graphs showing the CO amount, HC amount, NO amount and $NO_2$ amount at each part of the oxidation catalyst and CSF.

As shown in FIG. 3, the CO, HC and NO contained in the exhaust discharged from the engine are each oxidized in the course of passing through the oxidation catalyst and CSF; therefore, the amount of each decreases from the upstream side to the downstream side. In addition, $NO_2$ is generated by the NO being oxidized; therefore, the $NO_2$ amount increases from the upstream side to the downstream side.

Furthermore, in the oxidation catalyst and the CSF having substantially the same function as this oxidation catalyst, there is an order of precedence in the order of CO, HC and NO for the oxidation reactions of CO, HC and NO. In other words, in the process of exhaust containing CO, HC and NO passing through the oxidation catalyst and CSF, CO is oxidized the earliest (i.e. the most upstream), followed by HC being oxidized, and finally (i.e. most downstream) NO being oxidized to generate $NO_2$. More specifically, NO in the exhaust is oxidized after there is no longer CO and HC in the exhaust, and $NO_2$ is generated; therefore, when CO and HC are contained in the exhaust in abundance, there is a tendency for the NO oxidation efficiency to decline prior to the CO and HC oxidation efficiencies declining in the oxidation catalyst and CSF.

In addition, generally with an oxidation catalyst and CSF, accompanying the space velocity of the exhaust, i.e. the throughput per unit time of the substances oxidizing (CO, HC, NO) (g/s), increasing, the oxidation efficiency thereof declines. Furthermore, as described in the foregoing, since NO in the exhaust is oxidized at the most downstream side of the oxidation catalyst and CSF, when the volume of exhaust discharged from the engine increases, there is a tendency for the NO oxidation efficiency to decline prior to the CO and HC oxidation efficiencies declining.

Referring back to FIG. 1, the urea water injection device 25 includes a urea water tank 251 and a urea water injection valve 253. The urea water tank 251 stores urea water, and is connected to the urea water injection valve 253 via a urea water supply pipe 254 and a urea water pump, which is not illustrated. A urea water level sensor 255 is provided to this urea water tank 251. The urea water level sensor 255 detects the water level of the urea water in the urea water tank 251, and outputs a detection signal substantially proportional to this water level to the ECU 3. The urea water injection valve 253 is connected to the ECU 3, operates according to a control signal from the ECU 3, and injects urea water into the exhaust plumbing 11 in accordance with this control signal.

The selective reduction catalyst 23 selectively reduces NOx in the exhaust under an atmosphere in which a reducing agent such as $NH_3$ is present. More specifically, when urea water is injected by the urea water injection device 25, this urea water is thermally decomposed or hydrolyzed by the heat of the exhaust, and NH3 is produced as a reducing agent. The $NH_3$ thus produced is supplied to the selective reduction catalyst 23, and NOx in the exhaust is selectively reduced by this $NH_3$. Thus, in certain aspects, the urea water injection valve is a reducing agent supply device.

The reaction formulas of the reduction reactions of NO and $NO_2$ progressing in the selective reduction catalyst 23 under the presence of $NH_3$ are as shown in the following formulas (1-1), (1-2), and (1-3). The reaction shown in formula (1-1) is a reaction simultaneously reducing NO and $NO_2$ in the exhaust, and is called Fast SCR (selective catalytic reduction). The reaction shown in formula (1-2) is a reaction reducing only NO in the exhaust, and is called Standard SCR. The reaction shown in formula (1-3) is a reaction reducing only $NO_2$ in the exhaust, and is called Slow SCR.

$$NO + NO_2 + 2NH_3 \rightarrow 2N_2 + 3H_2O \qquad (1\text{-}1)$$

$$4NO + 4NH_3 + O_2 \rightarrow 4N_2 + 16H_2O \qquad (1\text{-}2)$$

$$6NO_2 + 8NH_3 \rightarrow 7N_2 + 16H_2O \qquad (1\text{-}3)$$

Although it has been configured so that NO and $NO_2$ in the exhaust are reduced by $NH_3$ by the reactions shown in the above formulas (1-1) to (1-3) progressing on the selective reduction catalyst, the extent of progression of each reaction changes depending on the $NO_2$—NOx ratio.

For example, in a case of the $NO_2$—NOx ratio being 0.5, the mole ratio of NO to $NO_2$ in the exhaust is 1:1; therefore, the reaction shown in the above formula (1-1) mainly progresses in the selective reduction catalyst. This Fast SCR has the fastest reaction rate among these three reactions.

In a case of the $NO_2$—NOx ratio being less than 0.5, i.e. in a case of NO being more abundant that $NO_2$, the NO that has not been reduced by the reaction shown in the above formula (1-1) remains; however, the NO of this surplus amount is reduced by the reaction shown in the above formula (1-2) progressing. Therefore, in a case of the $NO_2$—NOx ratio being less than 0.5, the extent of progression of the reaction shown in the above formula (1-1) decreases accompanying the $NO_2$—NOx ratio decreasing, and the extent of progression of the reaction shown in the above formula (3-2) increases. This Standard SCR has the slowest reaction rate among these three reactions.

On the other hand, in a case of the $NO_2$—NOx ratio being greater than 0.5, i.e. in a case of $NO_2$ being more abundant than NO, the $NO_2$ that has not been reduced by the reaction shown in the above formula (1-1) remains; however, the $NO_2$ of this surplus amount is reduced by the reaction shown in the above formula (1-3) progressing. Therefore, in a case of the $NO_2$—NOx ratio being greater than 0.5, the extent of progression of the reaction shown in the above formula (1-1) decreases accompanying the $NO_2$—NOx ratio increasing, and the extent of progression of the reaction shown in the above formula (1-3) increases. The reaction rate of this Slow SCR is faster than Standard SCR, and it is slower than Fast SCR.

Figure 4:
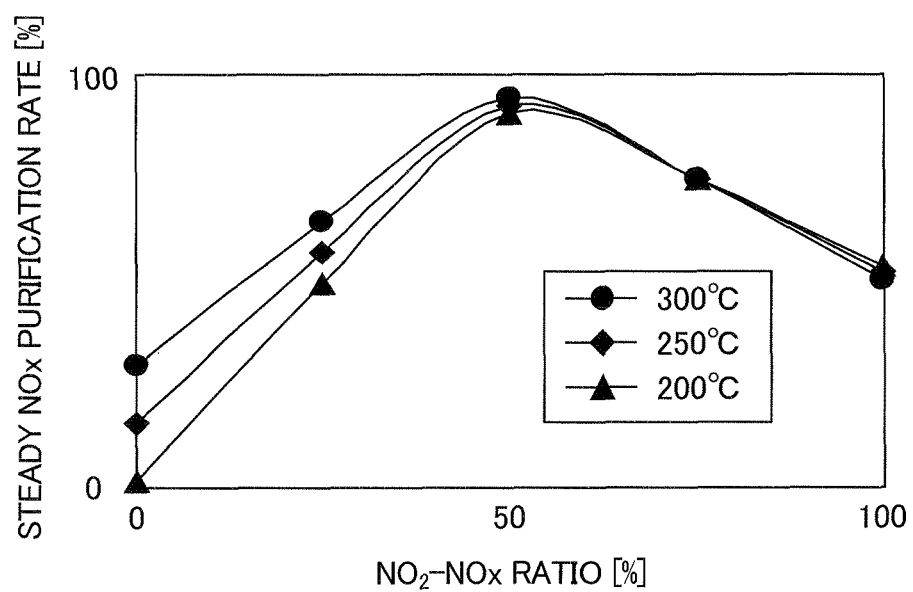
FIG. 4 is a graph showing a relationship between a $NO_2$—NOx ratio of exhaust flowing into the selective reduction catalyst and a steady NOx purification rate.

FIG. 4 is a graph showing a relationship between a $NO_2$—NOx ratio of exhaust flowing into the selective reduction catalyst and a steady NOx purification rate. Herein, steady NOx purification rate indicates a NOx purification rate when constantly supplying exhaust at a constant SV while keeping the selective reduction catalyst at a constant temperature, and the reactions progressing in the selective reduction catalyst and the internal state thereof are steady. In other words, a transitional change in the NOx purification rate immediately after initiating the supply of exhaust is not taken into consideration in this steady NOx purification rate.

As shown in FIG. 4, when setting the $NO_2$—NOx ratio to 0.5, Fast SCR having the fastest reaction rate primarily progresses in the selective reduction catalyst; therefore, the steady NOx purification will be the highest. In contrast, when the $NO_2$—NOx ratio is increased from 0.5, in order to reduce a surplus amount of $NO_2$ that cannot be reduced by only Fast SCR, the proportion for which Slow SCR progresses, which has a slower reaction rate than Fast SCR, increases; therefore, the steady NOx purification rate declines. Conversely, when the $NO_2$—NOx ratio is decreased from 0.5, in order to reduce the surplus amount of NO that could not be reduced by only Fast SCR, the proportion for which Standard SCR, which has a reaction rate slower than Slow SCR, increases; therefore, the steady NOx purification rate declines.

In addition, the steady NOx purification rate shows an upward convex characteristic relative to the temperature of the selective reduction catalyst. According to the example shown in FIG. 4, the steady NOx purification rate is the highest when the temperature of the selective reduction catalyst is about 250° C., and declines if raised or lowered from this optimum temperature.

Referring back to FIG. 1, the selective reduction catalyst 23 has a function of reducing NOx in the exhaust with $NH_3$ generated from urea water, as well as having a function of storing a predetermined amount of the $NH_3$ generated. Hereinafter, a $NH_3$ amount stored in the selective reduction catalyst 23 is defined as a $NH_3$ storage amount, and a $NH_3$ amount that can be stored in the selective reduction catalyst 23 is defined as a maximum $NH_3$ storage capacity.

The $NH_3$ stored in the selective reduction catalyst 23 in this way is also consumed as appropriate in the reduction of NOx in the exhaust. As a result, the NOx purification rate of the selective reduction catalyst 23 increases in accordance with the $NH_3$ storage amount increasing. On the other hand, when the $NH_3$ storage amount approaches the maximum $NH_3$ storage capacity and the selective reduction catalyst 23 enters a saturated state, although the NOx purification rate also approaches a maximum value, $NH_3$ slip occurs in which the $NH_3$ not contributing to the reduction of NOx and has become surplus is discharged to the downstream side of the selective reduction catalyst 23. In order to prevent the $NH_3$ discharged to the downstream side of the selective reduction catalyst 23 from discharging to outside the system in this way, a slip suppressing catalyst 24 is provided on the downstream side of the selective reduction catalyst 23. For example, an oxidation catalyst that oxidizes $NH_3$ having slipped from the selective reduction catalyst 23 to decompose into $N_2$ and $H_2O$, a selective reduction catalyst that stores the $NH_3$ having slipped or provides this $NH_3$ in the reduction of NOx in the exhaust, or the like can be used as this slip suppressing catalyst 24.

In addition, this selective reduction catalyst 23 contains zeolite, and thus also has a function of adsorbing $NO_2$ and HC in the exhaust and storing in a predetermined amount. Hereinafter, the $NO_2$ amount stored in the selective reduction catalyst 23 is defined as a $NO_2$ storage amount, and the $NO_2$ amount that can be stored in the selective reduction catalyst 23 is defined as a maximum $NO_2$ storage amount.

With the selective reduction catalyst 23 provided with such a $NO_2$ adsorption function, in a case of the exhaust flowing thereinto becoming $NO_2$ excessive ($NO_2$—NOx ratio>0.5), the $NO_2$ that could not be reduced is adsorbed. Then, the $NO_2$ stored in the selective reduction catalyst 23 in this way is released when the exhaust flowing into the selective reduction catalyst 23 becomes NO excessive ($NO_2$—NOx ratio<0.5), and is reduced by way of Fast SCR along with NO supplied in surplus. In other words, the selective reduction catalyst 23 provided with the $NO_2$ adsorption function will adsorb and release $NO_2$ as if to maintain the $NO_2$—NOx ratio at the optimum value, even in a case of the $NO_2$—NOx ratio of the exhaust flowing thereinto changing from the optimum value to the $NO_2$ excessive side or NO excessive side.

Referring back to FIG. 1, in order to detect the state of the engine 1 and exhaust purification system 2, a catalyst temperature sensor 41, $NH_3$ sensor 42, $NO_2$ sensor 43, crank angle position sensor 14, accelerator opening sensor 15, airflow meter 16, etc. are connected to the ECU 3.

The exhaust temperature sensor 41 detects the exhaust temperature on downstream sides of oxidation catalyst 21 and CSF 22, and supplies a signal substantially proportional to the detection value to the ECU 3. With the ECU 3, a temperature of the selective reduction catalyst 23 and a temperature of the oxidation catalyst 21 are estimated based on the detection value of this exhaust temperature sensor 41. It should be noted that, although the temperature of the oxidation catalyst 21 and the temperature of the CSF 22 are treated as being substantially equal in the present embodiment, it is not limited thereto.

The $NH_3$ sensor 42 detects the concentration of ammonia in the exhaust in the exhaust plumbing 11 between the selective reduction catalyst 23 and the slip suppressing catalyst 24, and supplies a signal substantially proportional to the detection value to the ECU 3. The $NO_2$ sensor 43 detects the concentration of $NO_2$ in the exhaust in the exhaust plumbing 11 immediately after the selective reduction catalyst 23, and supplies a signal substantially proportional to the detection value to the ECU 3.

The air-flow meter detects the intake air amount flowing through an intake channel, which is not illustrated, and supplies an output signal substantially proportional to the intake air amount detected to the ECU 3. The crank angle position sensor 14 detects the rotation angle of the crank shaft of the engine 1 along with generating a pulse at every predetermined crank angle, and supplies this pulse signal to the ECU 3. An engine revolution speed of the engine 1 is calculated by the ECU 3 based on this pulse signal. The accelerator opening sensor 15 detects a depression amount (hereinafter referred to as "accelerator opening") of the accelerator pedal, which is not illustrated, of the vehicle, and supplies a detection signal substantially proportional to the accelerator opening thus detected to the ECU 3. An engine load of the engine 1 is calculated in accordance with this accelerator opening and engine revolution speed by the ECU 3. In addition, the exhaust flowrate is calculated by the ECU 3 based on the output value of the air-flow meter substantially, which is proportional to the intake air amount, the engine revolution speed, and the like.

The ECU 3 is provided with an input circuit having functions such as of shaping input signal waveforms from every kind of sensor, correcting the voltage levels to predetermined levels, and converting analog signal values to digital signal values, and a central processing unit (hereinafter referred to as "CPU"). In addition to this, the ECU 3 is provided with a storage circuit that stores every kind of calculation program executed by the CPU, calculation results, and the like, and an output circuit that outputs control signals to the engine 1, high-pressure EGR valve 262, urea water injection valve 253, and the like.

Figure 5:
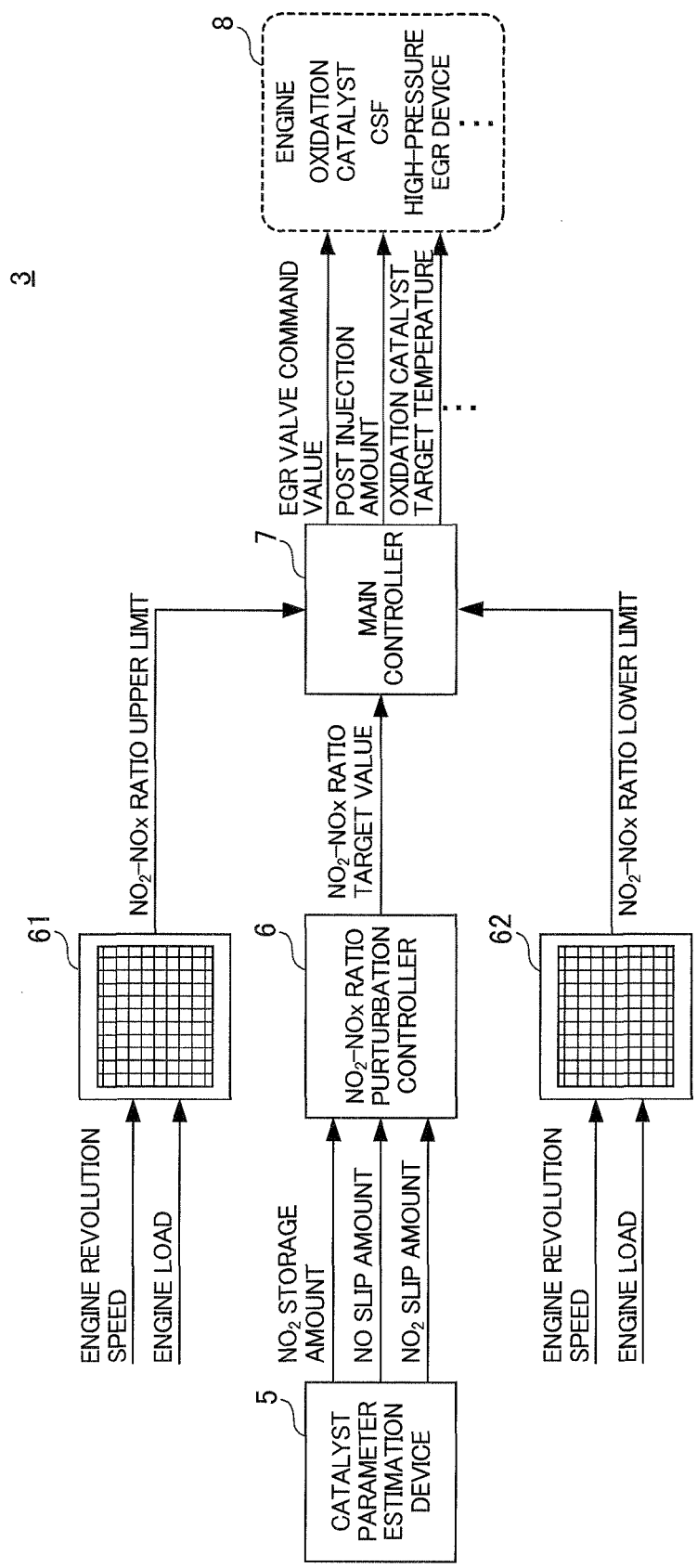
FIG. 5 is a diagram showing the configuration of blocks related to the determination of command values and the like for a $NO_2$—NOx ratio adjustment mechanism according to the embodiment.

Among the control blocks configured in the ECU 3, FIG. 5 is a diagram showing the blocks related to the deciding of a command value and target value for the $NO_2$—NOx ratio adjustment mechanism 8 and a correction value for the map values of this command value and target value (hereinafter, these are collectively referred to as "command values"). In this regard, among the devices configuring the exhaust purification system 2 in which the selective reduction catalyst 23 is provided in the exhaust plumbing 11 such as that shown in FIG. 1, the $NO_2$—NOx ratio adjustment mechanism 8 refers to devices that can cause the $NO_2$—NOx ratio of the exhaust flowing into the selective reduction catalyst 23 to change.

For example, the oxidation catalyst 21 and CSF 22 have an ability that can oxidize NO in the exhaust to convert to $NO_2$ and the NO oxidation efficiency thereof varies depending on the temperature; therefore, it is possible to cause the $NO_2$—NOx ratio to change by changing the temperature thereof. Therefore, this oxidation catalyst 21 and CSF 22 are included in the $NO_2$—NOx ratio adjustment mechanism 8.

In addition, the engine 1 causes the oxygen concentration of the exhaust flowing into the oxidation catalyst 21 and CSF 22, i.e. the NO oxidation efficiency of the oxidation catalyst 21 and CSF 22, to change by changing the air-fuel ratio of the air-fuel mixture thereof, for example, and thus can cause the $NO_2$—NOx ratio to change. Therefore, the engine 1 is included in the $NO_2$—NOx ratio adjustment mechanism 8.

In addition, the high-pressure EGR device 26 causes the NO amount discharged from the engine 1 and the exhaust flowrate, i.e. the NO oxidation efficiency of the oxidation catalyst 21 and CSF 22, to change by changing EGR amount, for example, and thus can cause the $NO_2$—NOX ratio to change. Therefore, the high-pressure EGR device 26 is included in the $NO_2$—NOx ratio adjustment mechanism 8. Furthermore, since it is possible to cause the $NO_2$—NOx ratio of the exhaust flowing into the selective reduction catalyst to change depending on the boost pressure of the engine 1, intake air amount, the turbocharger, throttle valve, not illustrated in FIG. 1, are also included in the $NO_2$—NOx ratio adjustment mechanism 8.

As specific examples of the command values for the $NO_2$—NOx ratio adjustment mechanism 8, only the three of the target value for the temperature of the oxidation catalyst 21 (oxidation catalyst target temperature), target value for the air-fuel ratio of the air-fuel mixture of the engine 1 (target air-fuel ratio), and the command value for the lift amount of the high-pressure EGR valve 262 (EGR valve command value) are exemplarily listed in FIG. 5; however, the present invention is not limited to these.

As modules for deciding the command value of the $NO_2$—NOx ratio adjustment mechanism 8, a catalyst parameter estimation device 5 that estimates catalyst parameters for evaluating the state of the selective reduction catalyst and the exhaust immediately thereafter (NO amount and $NO_2$ amount discharged from the selective reduction catalyst, and $NO_2$ storage amount), and a $NO_2$—NOx ratio perturbation controller 6 and a main controller 7 that execute the $NO_2$—NOx ratio perturbation control described later are formed in the ECU 3, as shown in FIG. 5.

It should be noted that, in addition to the control block shown in FIG. 5, for example, a control block for deciding urea water injection control, i.e. an injection amount of urea water from the urea water injection valve 253, is formed in the ECU 3. More specifically, in urea water injection control, the injection amount of urea water is determined based on the detection value of the $NH_3$ sensor 42 provided on the downstream side of the selective reduction catalyst 23, while estimating the $NH_3$ storage amount and maximum $NH_3$ storage capacity of the selective reduction catalyst 23, so that this $NH_3$ storage amount is maintained near the maximum storage capacity. By maintaining the $NH_3$ storage amount near the maximum $NH_3$ storage capacity in this way, the $NH_3$ slip from the selective reduction catalyst 23 is held at the minimum, while being able to maintain the NOx purification rate of the selective reduction catalyst 23 to be high. It should be noted that a detailed algorithm of the above such urea water injection control is described in detail by the applicants of the present application in PCT International Publication No. WO2009/128169, etc., and thus a detailed explanation in addition thereto will be omitted herein.

Hereinafter, the configurations of the catalyst parameter estimation device 5, perturbation controller 6, and main controller 7 in FIG. 5 will be explained in order.

Catalyst Parameter Estimation Device 5

Figure 6:
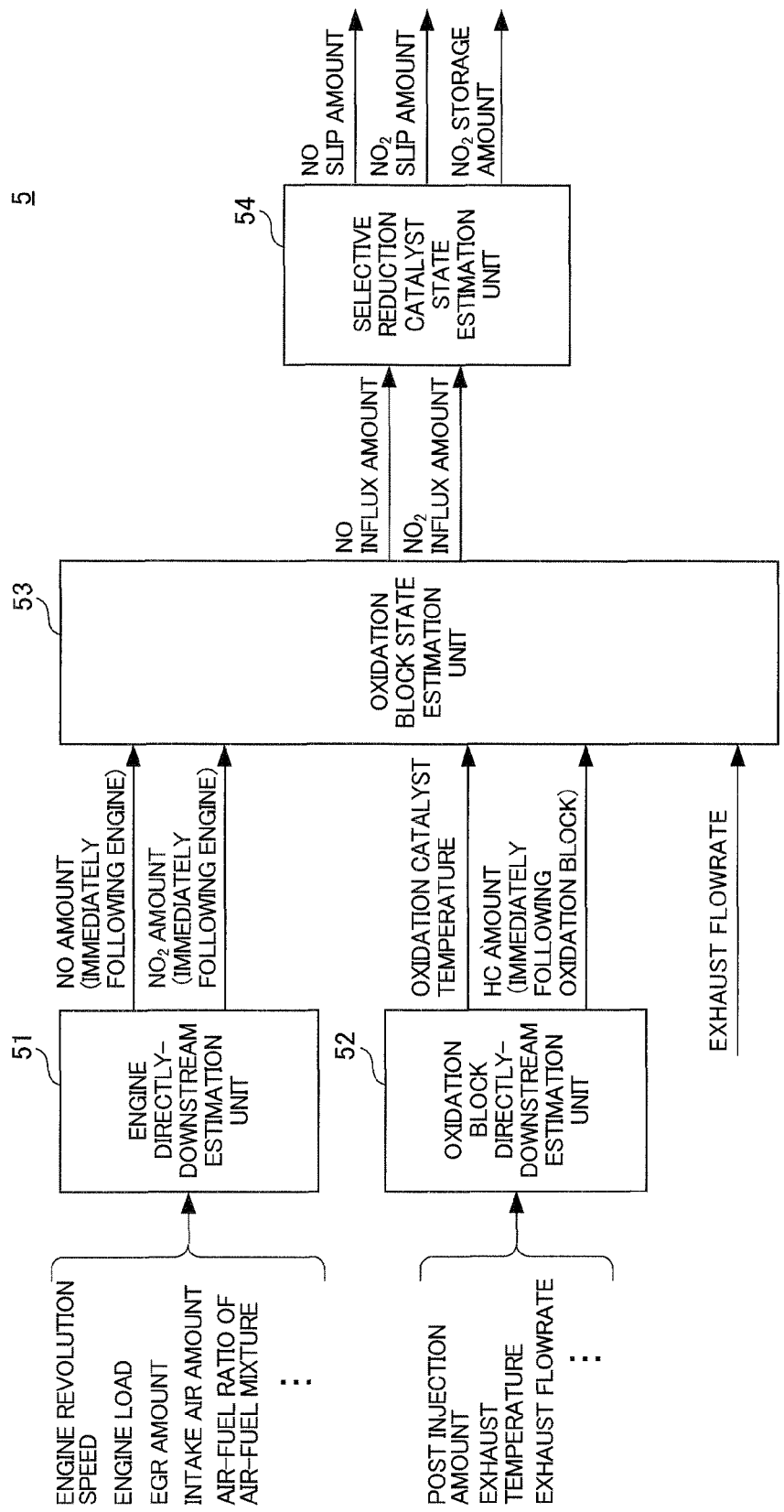
FIG. 6 is a block diagram showing the configuration of a catalyst parameter estimation device according to the embodiment.

FIG. 6 is a block diagram showing the configuration of the catalyst parameter estimation device 5.

As shown in FIG. 6, the catalyst parameter estimation device 5 is configured to include an engine direct-downstream estimation unit 51 that estimates the state of exhaust immediately following the engine, an oxidation block state estimation unit 52 that estimates the state of an oxidation block consisting of the oxidation catalyst and CSF, an oxidation block direct-downstream estimation unit 53 that estimates the state of the exhaust immediately following this oxidation block, and a selective reduction catalyst state estimation unit 54 that estimates the state of the selective reduction catalyst and the exhaust immediately thereafter.

The engine direct-downstream estimation unit 51 estimates NO amount (or NO concentration) and $NO_2$ amount (or $NO_2$ concentration) contained in the exhaust discharged from the engine, i.e. exhaust flowing into the oxidation reduction catalyst, based on parameters expressing the operating state of the engine such as the engine revolution speed, engine load, EGR amount, intake air amount and air-fuel ratio of the air-fuel mixture.

The oxidation block state estimation unit 52 estimates the oxidation catalyst temperature and the HC amount (or HC concentration) contained in the exhaust discharged from the CSF to the downstream side, based on the post injection amount, exhaust temperature, exhaust flowrate, and the like.

The oxidation block direct-downstream estimation unit 53 estimates the state of the exhaust immediately following the oxidation block, i.e. NO amount (or NO concentration) and $NO_2$ amount (or $NO_2$ concentration) contained in the exhaust flowing into the selective reduction catalyst, based on parameters correlated to the NO oxidation efficiency of the oxidation block, such as the NO amount and $NO_2$ amount estimated in the engine direct-downstream estimation unit 51, the oxidation catalyst temperature and HC amount estimated in the oxidation block state estimation unit 52, and the exhaust temperature. It should be noted that the NO amount and $NO_2$ amount estimated by this oxidation block direct-downstream estimation unit 53 will be referred to hereinafter as NO influx amount and $NO_2$ influx amount, respectively.

Figure 7:
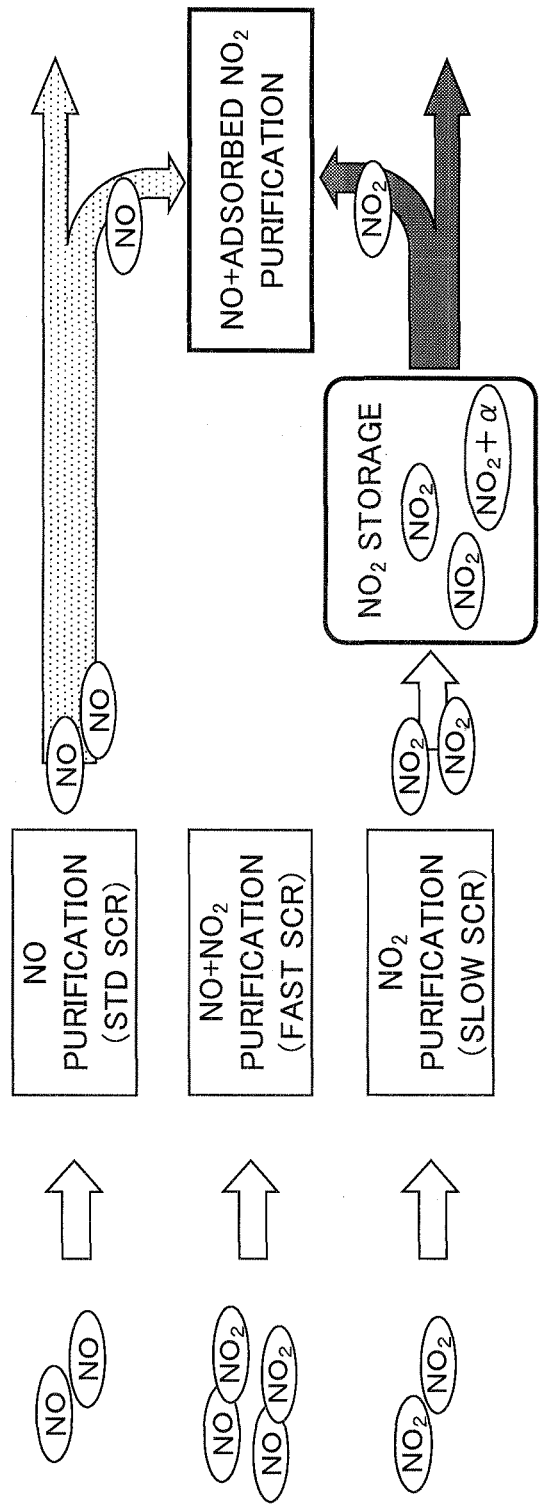
FIG. 7 is a diagram schematically showing a selective reduction catalyst model according to the embodiment.

The selective reduction catalyst state estimation unit 54 estimates the $NO_2$ storage amount of the selective reduction catalyst, the NO amount (or NO concentration and $NO_2$ amount (or $NO_2$ concentration) of the exhaust immediately following the selective reduction catalyst according to the selective reduction catalyst model shown in FIG. 7, based on the NO amount and $NO_2$ amount estimated in the oxidation block direct-downstream estimation unit 53. It should be noted that the NO amount and $NO_2$ amount discharged from the selective reduction catalyst in particular will be referred to hereinafter as NO slip amount and $NO_2$ slip amount, respectively.

FIG. 7 is a diagram schematically showing a selective reduction catalyst model mimicking the purification of NOx and adsorption of $NO_2$ in the selective reduction catalyst.

As described in the foregoing, the different NOx reduction reactions of the three types of reaction rates of Fast, Slow and Standard progress on the selective reduction catalyst under the presence of $NH_3$. In addition, since there is an ability of adsorbing $NO_2$ in the exhaust and storing in a predetermined amount in the selective reduction catalyst, the reactions progressing in the selective reduction catalyst change greatly depending on the $NO_2$ storage amount thereof and the $NO_2$—NOx ratio of the exhaust flowing into the selective reduction catalyst. Hereinafter, the reactions progressing in the selective reduction catalyst for the NO and $NO_2$ flowing thereinto will be explained by breaking into the cases of (A) a state in which the $NO_2$ storage amount is 0 or close thereto; (B) a state in which the $NO_2$ storage amount is the maximum $NO_2$ storage capacity or close thereto; and (C) a state in which the $NO_2$ storage amount is sufficiently greater than 0 and sufficiently less than the maximum $NO_2$ storage capacity, and thus $NO_2$ is adsorbed in just proportion.

(A) State in which $NO_2$ Storage Amount is 0 or Close Thereto.

In a case of the $NO_2$ storage amount being 0 or close thereto, and $NO_2$ being slightly adsorbed on the selective reduction catalyst, although there is margin in the $NO_2$ adsorption function of the selective reduction catalyst, there is considered to be no margin in the $NO_2$ release function.

In such a state, if $NO_2$ excessive ($NO_2$—NOx ratio>0.5) exhaust flows thereinto, Fast SCR to reduce both NO in the exhaust and $NO_2$ of the same amount as this NO progresses in the selective reduction catalyst. In addition, the reaction reducing the $NO_2$ constituting the surplus is Slow SCR, which has a slower reaction rate; therefore, the steady NOx (particularly $NO_2$) purification rate is low. However, there is margin in the $NO_2$ adsorption function, and the $NO_2$ that has not been reduced can be adsorbed on the selective reduction catalyst; therefore, the transitional NOx purification rate while $NO_2$ can be adsorbed is high. In other words, in this case, the $NO_2$ storage amount increases, while the NOx purification rate thereof is maintained to be high.

On the other hand, if NO excessive ($NO_2$—NOx ratio<0.5) exhaust flows thereinto, Fast SCR to reduce both $NO_2$ in the exhaust and NO of the same amount as this $NO_2$ progresses in the selective reduction catalyst. In addition, the reaction reducing the NO constituting the surplus herein is Standard SCR, which has a slower reaction rate; therefore, the steady NOx (particularly NO) purification rate is low. Furthermore, since there is no margin in the $NO_2$ release function, and the $NO_2$ released from the selective reduction catalyst in order to cause Fast SCR to progress with the NO constituting the above-mentioned surplus is also scarce, the transitional NOx purification rate also remains low.

(B) State in which $NO_2$ Storage Amount is Maximum $NO_2$ Storage Capacity or Close Thereto In a case of the $NO_2$ storage amount being the maximum $NO_2$ storage capacity or close thereto, and $NO_2$ of an amount near the limit is adsorbed on the selective reduction catalyst, although there is margin in the $NO_2$ release function, there is considered to be no margin in the $NO_2$ adsorption function in the selective reduction catalyst.

In such a state, if $NO_2$ excessive exhaust flows thereinto, Fast SCR to reduce both the NO in the exhaust and $NO_2$ of the same amount as this NO will progress in the selective reduction catalyst. In addition, the reaction reducing the $NO_2$ constituting the surplus herein is Slow SCR, which has a slower reaction rate; therefore, the steady NOx (particularly $NO_2$) purification rate is low. Furthermore, since there is no margin in the $NO_2$ adsorption function, and the $NO_2$ not having been reduced cannot be adsorbed on the selective reduction catalyst, the NOx purification rate remains low also transitionally.

On the other hand, when NO excessive exhaust flows thereinto, Fast SCR to reduce both the $NO_2$ in the exhaust and NO of the same amount as this $NO_2$ progresses in the selective reduction catalyst. In addition, the reaction reducing the NO constituting the surplus herein is Standard SCR, which has a slower reaction rate; therefore, the steady NOx (particularly NO) purification rate is low. However, since there is margin in the $NO_2$ release function, the proportion of the NO constituting the above-mentioned surplus reduced with the $NO_2$ released from the selective reduction catalyst by way of Fast SCR becomes greater than the proportion reduced by NO alone by way of Standard SCR; therefore, the transitional NOx purification rate while $NO_2$ can be released is high. In other words, in this case, the $NO_2$ storage amount decreases, while the NOx purification rate is maintained to be high.

(C) State in which $NO_2$ is Adsorbed in Just Proportion

In a case of $NO_2$ being adsorbed in just proportion on the selective reduction catalyst, there is considered to be margin in both the $NO_2$ adsorption function and $NO_2$ release function of the selective reduction catalyst.

In such a state, if $NO_2$ excessive exhaust flows thereinto, Fast SCR to reduce both the NO in the exhaust and $NO_2$ of the same amount as this NO will progress in the selective reduction catalyst. In addition, the reaction reducing the $NO_2$ constituting the surplus herein is Slow SCR, which has a slower reaction rate; therefore, the steady NOx (particularly $NO_2$) purification rate is low. However, there is a margin in the $NO_2$ adsorption function, and thus $NO_2$ that has not been reduced can be adsorbed on the selective reduction catalyst; therefore, the transitional NOx purification rate while $NO_2$ can be adsorbed is high. In other words, in this case, the $NO_2$ storage amount increases, while the NOx purification rate is maintained to be high.

On the other hand, if NO excessive exhaust flows thereinto, Fast SCR to reduce both the $NO_2$ in the exhaust and NO of the same amount as this $NO_2$ will progress in the selective reduction catalyst. In addition, the reaction reducing the NO constituting the surplus herein is Standard SCR, which has a slower reaction rate; therefore, the steady NOx (particularly NO) purification rate is low. However, since there is a margin in the $NO_2$ release function, the proportion of the NO constituting the above-mentioned surplus that is reduced with the $NO_2$ released from the selective reduction catalyst by way of Fast SCR becomes greater than the proportion reduced by NO alone by way of the above-mentioned Standard SCR; therefore, the transitional NOx purification rate while $NO_2$ can be released is high. In other words, in this case, the $NO_2$ storage amount decreases, while the NOx purification rate is maintained to be high.

Figure 8:
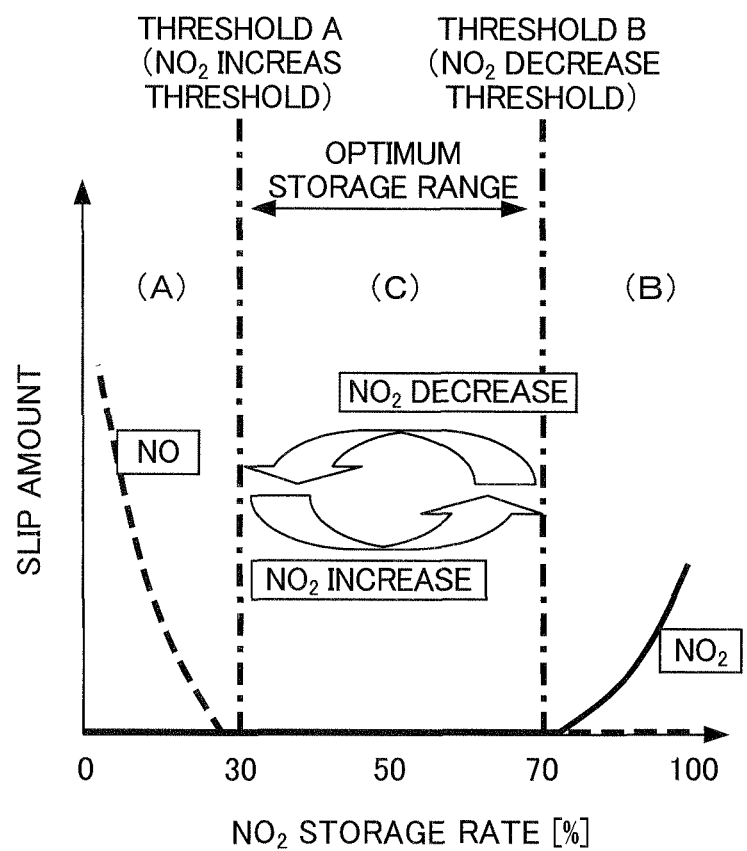
FIG. 8 is a graph showing a relationship between a $NO_2$ storage rate of the selective reduction catalyst and a slip amount of NO or $NO_2$.

FIG. 8 is a graph showing a relationship between a $NO_2$ storage rate (horizontal axis) of the selective reduction catalyst and a slip amount of NO or $NO_2$ (vertical axis). Herein, the $NO_2$ storage rate of the horizontal axis refers to the proportion of the $NO_2$ storage amount to the maximum $NO_2$ storage capacity. In FIG. 8, the solid line indicates the $NO_2$ slip amount immediately after initiating the supply of $NO_2$ excessive exhaust, and the dotted line indicates the NO slip amount immediately after initiating the supply of NO excessive exhaust.

As shown in FIG. 8, when the $NO_2$ storage rate is less than a threshold A (e.g., 30%), NO slip will occur immediately when the NO excessive exhaust is supplied. In other words, the above-mentioned state (A) in which the $NO_2$ release function declines corresponds to a state in which the $NO_2$ storage rate becomes smaller than the threshold A in this figure. In addition, when the $NO_2$ storage rate becomes higher than the threshold B (e.g., 70%), $NO_2$ slip will occur immediately when the $NO_2$ excessive exhaust is supplied. In other words, the above-mentioned state (B) in which the $NO_2$ adsorption function declines corresponds to a state in which the $NO_2$ storage rate becomes greater than the threshold B in this figure.

Therefore, in a case of the $NO_2$ storage rate being within an optimum storage range with the threshold A as a lower limit and the threshold B as an upper limit, NO or $NO_2$ will not immediately slip, even when supplying NO excessive or $NO_2$ excessive exhaust to the selective reduction catalyst. In other words, the above-mentioned state (C) in which there is margin in both the $NO_2$ release function and $NO_2$ adsorption function corresponds to a state in which the $NO_2$ storage rate is between the threshold A and the threshold B.

In this way, for the transitional NOx purification rate, it is considered that the robustness to change to the NO excessive side of the $NO_2$—NOx ratio declines when the $NO_2$ storage amount decreases, and the robustness to change to the $NO_2$ excessive side of the $NO_2$—NOx ratio declines when the $NO_2$ storage amount increases. Therefore, if $NO_2$ is adsorbed in the just proportion on the selective reduction catalyst, the robustness to both change to the NO excessive side and $NO_2$ excessive side of the $NO_2$—NOx ratio will be high, and is considered to be the most preferable state.

It should be noted that, although the thresholds A and B for the $NO_2$ storage rate and the optimum storage range are set in the above explanation, a similar optimum storage range is set for the $NO_2$ storage amount by multiplying the maximum $NO_2$ storage capacity by these thresholds A and B. Therefore, these thresholds A and B, as well as the optimum storage range are matters also set for the $NO_2$ storage amount.

Figure 9:
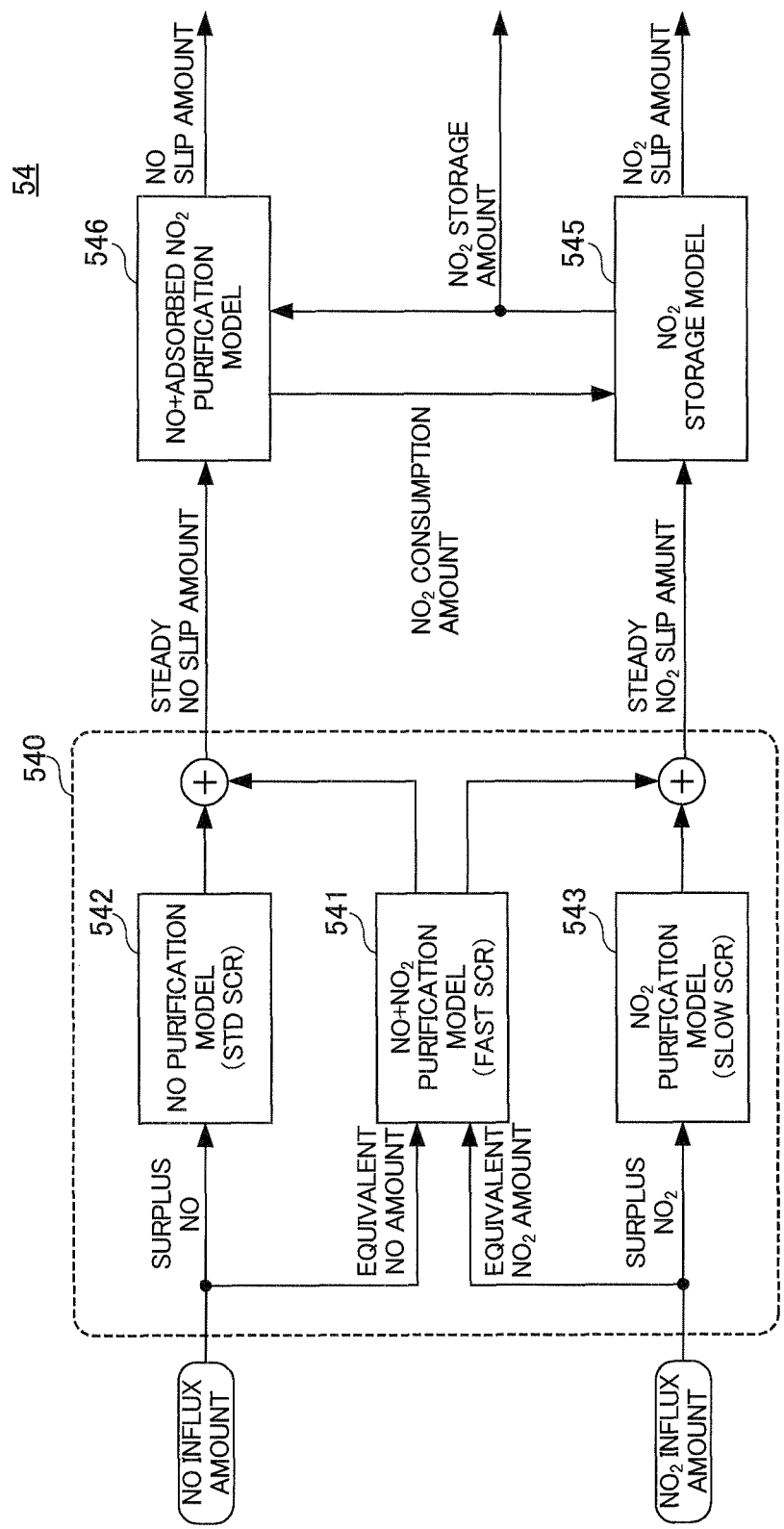
FIG. 9 is a block diagram showing the configuration of a selective reduction catalyst state estimation unit according to the embodiment.

FIG. 9 is a block diagram showing the configuration of the selective reduction catalyst state estimation unit 54.

This selective reduction catalyst state estimation unit 54 realizes the selective reduction catalyst model explained with reference to FIGS. 7 and 8, and is configured to include a steady slip amount operation part 540, $NO_2$ storage model operation part 545, and NO+adsorbed $NO_2$ purification model operation part 546.

The steady slip amount operation part 540 calculates a steady NO slip amount and steady $NO_2$ slip amount corresponding to the NO amount and $NO_2$ amount discharged from the selective reduction catalyst, in a case of continuing to steadily supply exhaust of the NO influx amount and $NO_2$ influx amount estimated in the oxidation block direct-downstream estimation unit 53 of FIG. 6 to the selective reduction catalyst. In other words, this steady NO slip amount and steady $NO_2$ slip amount respectively correspond to slip amounts in a case assuming there not being an $NO_2$ adsorption function or $NO_2$ release function in the selective reduction catalyst.

A steady NO+$NO_2$ purification model operation part 541 calculates, under the assumption that only Fast SCR progresses in the selective reduction catalyst, the amounts of NO and $NO_2$ discharged without being reduced among the NO and $NO_2$ flowing thereinto, based on a map established in advance.

A steady NO purification model operation unit 542 calculates, under the assumption that only Standard SCR progresses in the selective reduction catalyst, the amount of NO discharged without being reduced among the NO flowing thereinto, based on a map established in advance.

A steady $NO_2$ purification model operation part 543 calculates, under the assumption that only Slow SCR progresses in the selective reduction catalyst, the amount of $NO_2$ discharged without being reduced among the $NO_2$ flowing thereinto, based on a map established in advance.

Under the assumption that Fast SCR progresses for the lesser among the NO and $NO_2$ flowing thereinto, the steady slip amount operation unit 540 inputs the NO influx amount and $NO_2$ influx amount estimated, upon dividing into a part for which Fast SCR progresses (equivalent NO amount and equivalent $NO_2$ amount), a part for which Standard SCR progresses (surplus NO), and a part for which Slow SCR progresses (surplus $NO_2$), to the above-mentioned steady purification model operation parts 541, 542 and 543, respectively. It should be noted that, under the assumption that Fast SCR progresses for all of the lesser among the NO and $NO_2$ flowing thereinto, either the above-mentioned surplus NO or surplus $NO_2$ becomes 0.

Then, the steady slip amount operation part 540 defines the amount arrived at by totaling the slip amounts of NO calculated by the above-mentioned steady purification model operation parts 541 and 542 as a steady NO slip amount, and defines an amount arrived at by totaling the slip amount of $NO_2$ calculated by the model operation parts 541 and 542 as a steady $NO_2$ slip amount.

The $NO_2$ storage model operation part 545 estimates the $NO_2$ storage amount corresponding to the $NO_2$ adsorption amount of the selective reduction catalyst, and the $NO_2$ slip amount corresponding to the $NO_2$ amount discharged from the selective reduction catalyst.

The NO+adsorbed $NO_2$ purification model operation part 546 estimates a $NO_2$ consumption amount corresponding to a $NO_2$ amount consumed by Fast SCR progressing with the NO flowing into the selective reduction catalyst, among that adsorbed to the selective reduction catalyst, and a NO slip amount corresponding to the NO amount discharged from the selective reduction catalyst.

The $NO_2$ storage model operation part 545 sets the $NO_2$ amount newly adsorbed to the selective reduction catalyst among the steady $NO_2$ slip amount estimated in the steady slip amount operation part 540 (new $NO_2$ adsorption amount) to positive, sets the $NO_2$ consumption amount estimated in the above-mentioned NO+adsorbed $NO_2$ purification model operation part 546 to negative, and defines a value arrived at by adding this new $NO_2$ adsorption amount and $NO_2$ consumption amount as the $NO_2$ storage amount.

Herein, the new $NO_2$ adsorption amount is calculated by multiplying the $NO_2$ adsorption efficiency decided by searching a map (refer to FIG. 10), by the steady $NO_2$ slip amount. In addition, the $NO_2$ slip amount is calculated by subtracting the above-mentioned new $NO_2$ adsorption amount from the steady $NO_2$ slip amount.

Figure 10:
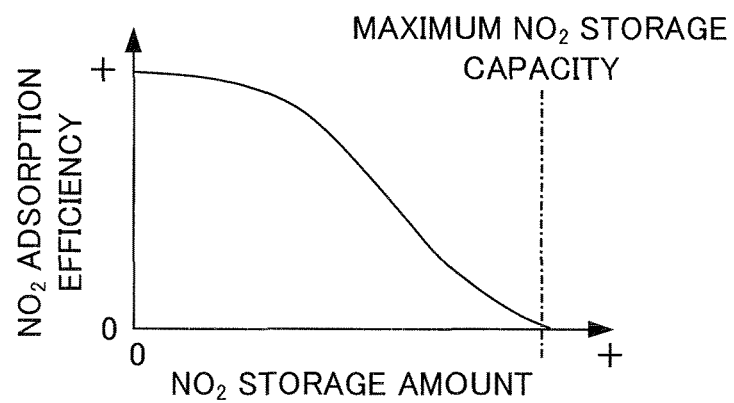
FIG. 10 is a graph showing an example of a map for determining the $NO_2$ adsorption efficiency according to the embodiment.

FIG. 10 is a graph showing an example of a map for deciding the $NO_2$ adsorption efficiency.

The $NO_2$ adsorption efficiency corresponding to the proportion of $NO_2$ adsorbed to the selective reduction catalyst among the $NO_2$ flowing thereinto decreases accompanying the $NO_2$ storage amount increasing, as shown in FIG. 10. In other words, the $NO_2$ adsorption function of the selective reduction catalyst declines accompanying the $NO_2$ storage amount increasing. It should be noted that the maximum $NO_2$ storage capacity corresponding to the upper limit of the $NO_2$ storage amount is defined as the $NO_2$ storage amount at which the $NO_2$ adsorption efficiency becomes almost 0 in the map shown in FIG. 10.

In addition, although FIG. 10 shows a specific example of a map for deciding the $NO_2$ adsorption efficiency based only on the $NO_2$ storage amount, the present invention is not limited thereto. The relationship between the $NO_2$ storage amount and $NO_2$ adsorption efficiency as well as the maximum $NO_2$ storage capacity change depending on the selective reduction catalyst temperature, extent of degradation of the selective reduction catalyst, $NH_3$ storage amount, and the like. In particular, among selective reduction catalysts, in addition to those that adsorb in the state of simply $NO_2$, it has been demonstrated that there are also those that adsorb in the state of a compound with $NH_3$. Furthermore, in connection with this, it has been demonstrated that there is a correlation between the $NO_2$ adsorption efficiency of the selective reduction catalyst and the amount of $NH_3$ adsorbed to the selective reduction catalyst. Therefore, the above-mentioned map may be corrected depending on the parameters correlated to the $NO_2$ adsorption function such as this selective reduction catalyst temperature, extent of degradation and $NH_3$ storage amount.

Referring back to FIG. 9, the NO+adsorbed $NO_2$ purification model operation part 546 calculates the NO amount (NO reduced amount) reduced by Fast SCR with the $NO_2$ adsorbed on the selective reduction catalyst, among the NO amount discharged as is without being reduced, in a case assuming there is no steady NO slip amount estimated in the steady slip amount operation part 540, i.e. NO release function in the selective reduction catalyst.

Herein, the NO reduced amount is calculated by multiplying the transitional NO purification rate decided by searching a map (refer to FIG. 11), by the steady NO slip amount. In addition, the NO slip amount is calculated by subtracting the above-mentioned NO reduced amount from the steady NO slip amount, and the $NO_2$ consumption amount is calculated as the $NO_2$ amount reduced with the NO of the above-mentioned NO reduced amount by way of Fast SCR.

Figure 11:
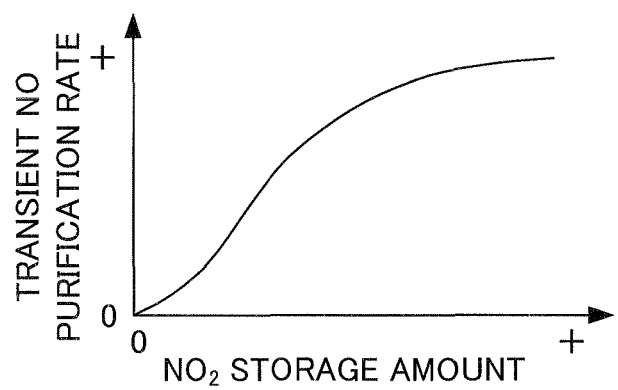
FIG. 11 is a graph showing an example of a map for determining a transient NOx purification rate according to the embodiment.

FIG. 11 is a graph showing an example of a map for determining a transient NOx purification rate.

The transient NO purification rate corresponding to a proportion of NO reduced with $NO_2$ released from the selective reduction catalyst, among the NO flowing thereinto, decreases accompanying the $NO_2$ storage amount increasing. In other words, the $NO_2$ release function of the selective reduction catalyst declines accompanying the $NO_2$ storage amount increasing.

Although the configuration of the selective reduction catalyst state estimation unit 54 that estimates the $NO_2$ storage amount, $NO_2$ slip amount and NO slip amount has been explained above while referring to FIGS. 9 to 11, the present invention is not limited thereto. For example, since more $NO_2$ is discharged accompanying the $NO_2$ storage amount approaching the maximum $NO_2$ storage capacity as described above, it is possible to determine being a state in which the actual $NO_2$ storage amount is near the actual maximum $NO_2$ storage capacity according to the output value of the $NO_2$ sensor provided on the downstream side of the selective reduction catalyst. Therefore, when the $NO_2$ storage amount is in the vicinity of the maximum storage capacity, the $NO_2$ storage amount may be corrected based on the shift between the output value of the $NO_2$ sensor and the $NO_2$ slip amount.

Furthermore, in a case of providing a NOx sensor that detects the NOx concentration of exhaust on the downstream side of the selective reduction catalyst in addition to the above-mentioned $NO_2$ sensor, the $NO_2$ storage amount may be corrected based on the output value of this NOx sensor. Currently existing NOx sensors are sensitive to NO, $NO_2$ and $NH_3$ in the exhaust; however, it is possible to estimated the NO amount discharged to the downstream side of the selective reduction catalyst by subtracting the output values of the $NH_3$ sensor and $NO_2$ sensor from the output value of this NOx sensor. Therefore, the $NO_2$ storage amount may be corrected based on the shift between the NO amount estimated based on the output value of the NOx sensor in this way, and the NO slip amount estimated by the above-mentioned selective reduction catalyst state estimation unit 54.

Next, referring back to FIG. 5, the configuration of the $NO_2$—NOx ratio perturbation controller 6 and the concept of $NO_2$—NOx ratio perturbation control executed by this perturbation controller 6 and main controller 7 will be explained.
$NO_2$—NOx Ratio Perturbation Controller As explained while referring to FIG. 8, when focusing on the $NO_2$ adsorption function and $NO_2$ release function of the selective reduction catalyst, if the $NO_2$ storage amount of the selective reduction catalyst is within the optimum storage range defined between the threshold A and the threshold B, it is understood that the NOx purification rate will be steadily maintained to be high even if the $NO_2$—NOx ratio changes from 0.5, which is the optimum value, to the NO excessive side or $NO_2$ excessive side. In addition, as shown in FIG. 8, since there is a significant span to such an optimum storage range, it is not necessary for the $NO_2$ storage amount to always be maintained constant, and so long as changing within this optimum storage range, the NOx purification rate will be steadily maintained to be high.

Therefore, since the present invention maintains the $NO_2$ storage amount within the optimum storage range, while permitting a certain degree of change thereof, the present invention focuses on the $NO_2$ balance of the selective reduction catalyst in a predetermined period with the adsorption of $NO_2$ as positive and the release thereof as negative.

Figure 12:
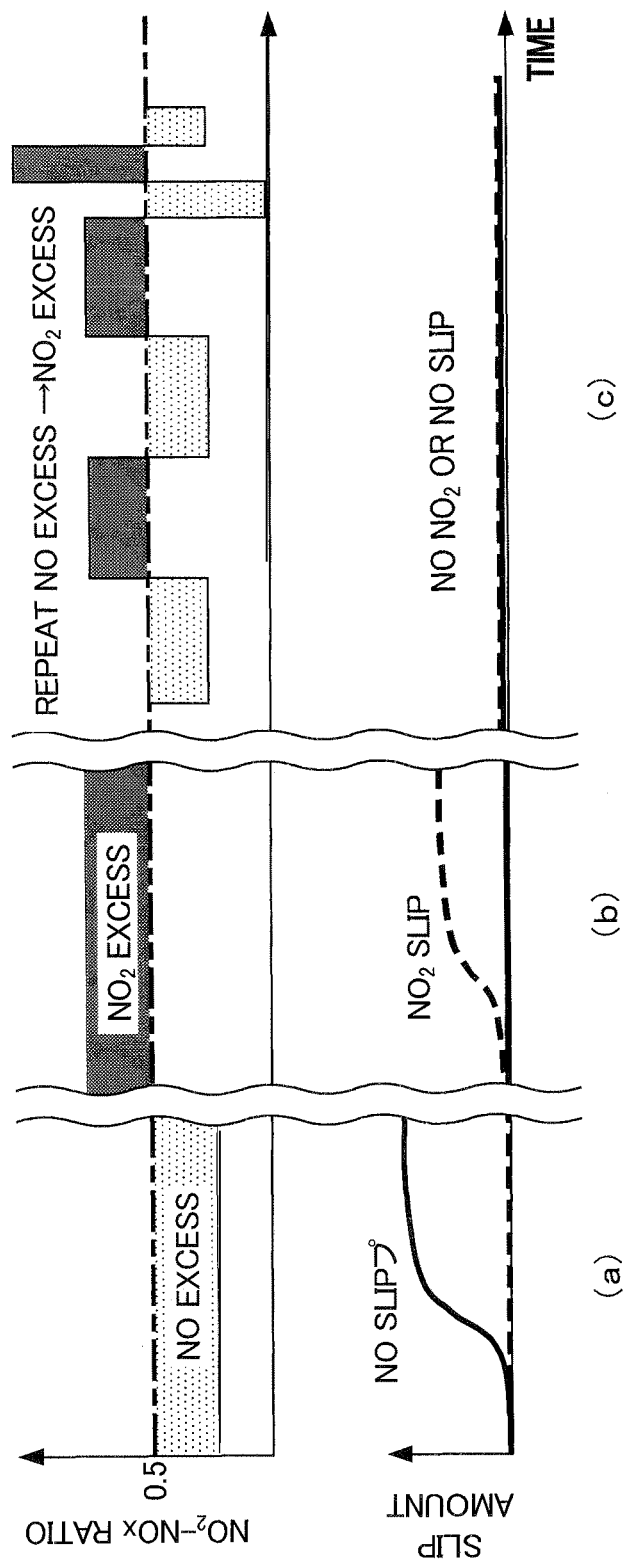
FIG. 12 is an illustration schematically showing a correlation between a variation pattern of the $NO_2$—NOx ratio flowing into the selective reduction catalyst and the slip amount of NO or $NO_2$.

FIG. 12 is an illustration schematically showing a correlation between a variation pattern of the $NO_2$—NOx ratio flowing into the selective reduction catalyst and the slip amount of NO or $NO_2$. FIG. 12 shows, in order from the left side, (a) a case of setting the $NO_2$—NOx ratio to a constant on the NO excessive side, (b) a case of setting the $NO_2$—NOx ratio to a constant on the $NO_2$ excessive side, and (c) a case of varying the $NO_2$—NOx ratio in various patterns under the condition of setting the $NO_2$ balance to 0 over a predetermined period.

In addition, the $NO_2$ storage rate when initiating the supply of exhaust was approximately 50%.

As shown in FIG. 12(a), in the case of continuously supplying NO excessive exhaust steadily, the NO slip amount increases in accordance with the decline in $NO_2$ storage amount. In addition, as shown in FIG. 12(b), in the case of continuously supply $NO_2$ excessive exhaust steadily, the $NO_2$ slip amount increases in accordance with a rise in the $NO_2$ storage amount.

In contrast, as shown in FIG. 12(c), the $NO_2$ storage amount is maintained within the above-mentioned optimum storage range in the case of periodically varying the $NO_2$—NOx ratio straddling a reference value in the vicinity of 0.5, so that the $NO_2$ balance in the predetermined period (e.g., one cycle) becomes approximately 0; therefore, neither NO nor $NO_2$ slip. In this way, under the conditions of periodically varying the $NO_2$—NOx ratio as well as setting the $NO_2$ balance of one period thereof to 0, the NOx purification rate comes to be steadily maintained to be high, irrespective of the details of the variation pattern of the $NO_2$—NOx ratio (depth to NO excessive side or $NO_2$ excessive side, time set to NO excessive side or $NO_2$ excessive side, etc.), as shown in FIG. 12(c). In the present invention, control that alternately executes $NO_2$ increase control to make the $NO_2$—NOx ratio larger than the reference value in the vicinity of 0.5 and $NO_2$ decrease control to make the $NO_2$—NOx ratio smaller than the reference value in this way is defined as $NO_2$—NOx ratio perturbation control. $NO_2$—NOx Ratio Perturbation Controller 6

Referring back to FIG. 5, the specific configuration of the $NO_2$—NOx ratio perturbation controller 6 will be explained.

The $NO_2$—NOx ratio perturbation controller 61 decides the target value of the $NO_2$—NOx ratio based on the $NO_2$ storage amount, the NO slip amount and $NO_2$ slip amount, and the like estimated by the catalyst parameter estimation device 5. More specifically, the $NO_2$—NOx ratio perturbation controller 61 causes this target value to vary in order to make the $NO_2$—NOx ratio larger and smaller than the reference value, so that the $NO_2$ balance of the selective reduction catalyst in a predetermined period becomes a predetermined target value.

Figure 13:
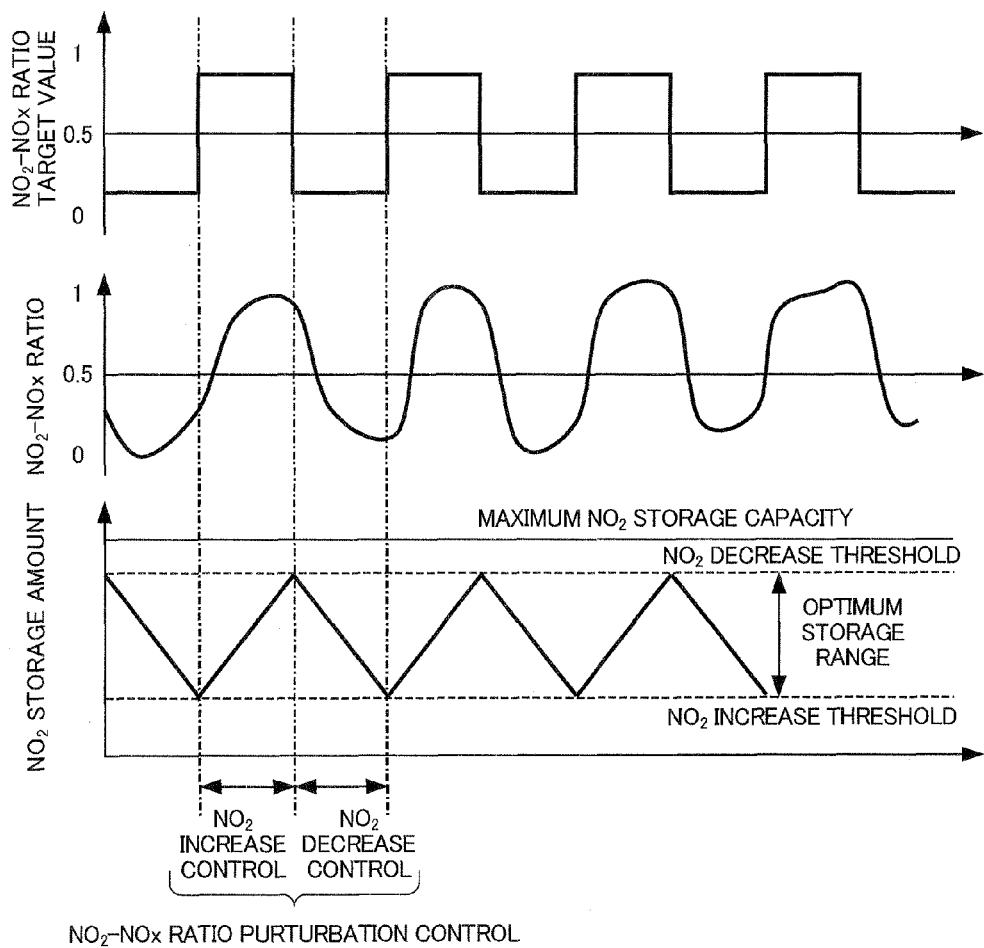
FIG. 13 provides time charts showing an example of operation of a perturbation controller according to the embodiment.

FIG. 13 provides time charts showing an example of operation of a perturbation controller 6. FIG. 13 shows, in order from the top, the target value of the $NO_2$—NOx ratio, $NO_2$—NOx ratio of the exhaust flowing into the selective reduction catalyst, and the $NO_2$ storage amount.

FIG. 13 shows a case of causing the target value of the $NO_2$—NOx ratio to binaurally change between a value on the $NO_2$ excessive side from the reference value (0.5) and a value on the NO excessive side from the reference value.

Upon the event of the estimated $NO_2$ storage amount becoming no more than a $NO_2$ increase threshold, the perturbation controller 6 sets the target value of the $NO_2$—NOx ratio to a value on the $NO_2$ excessive side, and makes the $NO_2$—NOx ratio of the exhaust flowing into the selective reduction catalyst larger than the reference value ($NO_2$ increase control). Thereafter, upon the event of the $NO_2$ storage amount increasing and becoming at least a $NO_2$ decrease threshold, the target value of the $NO_2$—NOx ratio is set to a value on the NO excessive side, and the $NO_2$—NOx ratio of the exhaust flowing into the selective reduction catalyst is made to be smaller than the reference value ($NO_2$ decrease control). The perturbation controller 6 alternately executes the above such $NO_2$ increase control and $NO_2$ decrease control ($NO_2$—NOx ratio perturbation control).

Herein, as shown in FIG. 8, by setting the $NO_2$ increase threshold as the lower limit of the optimum storage range and setting the $NO_2$ decrease threshold as the upper limit of the optimum storage range, it is possible to maintain the $NO_2$ storage amount of the selective reduction catalyst within the optimum storage range.

It should be noted that, although it does not mean that distinct operations are not gone through for the $NO_2$ balance and target value thereof in the above control example, if the period from initiating $NO_2$ increase control until the $NO_2$ decrease control ends is set as one period of $NO_2$—NOx ratio perturbation control, this would have the same meaning as executing $NO_2$—NOx ratio perturbation control so that the $NO_2$ balance during this one period becomes the target value set to 0 or in the vicinity thereof.

Figure 14:
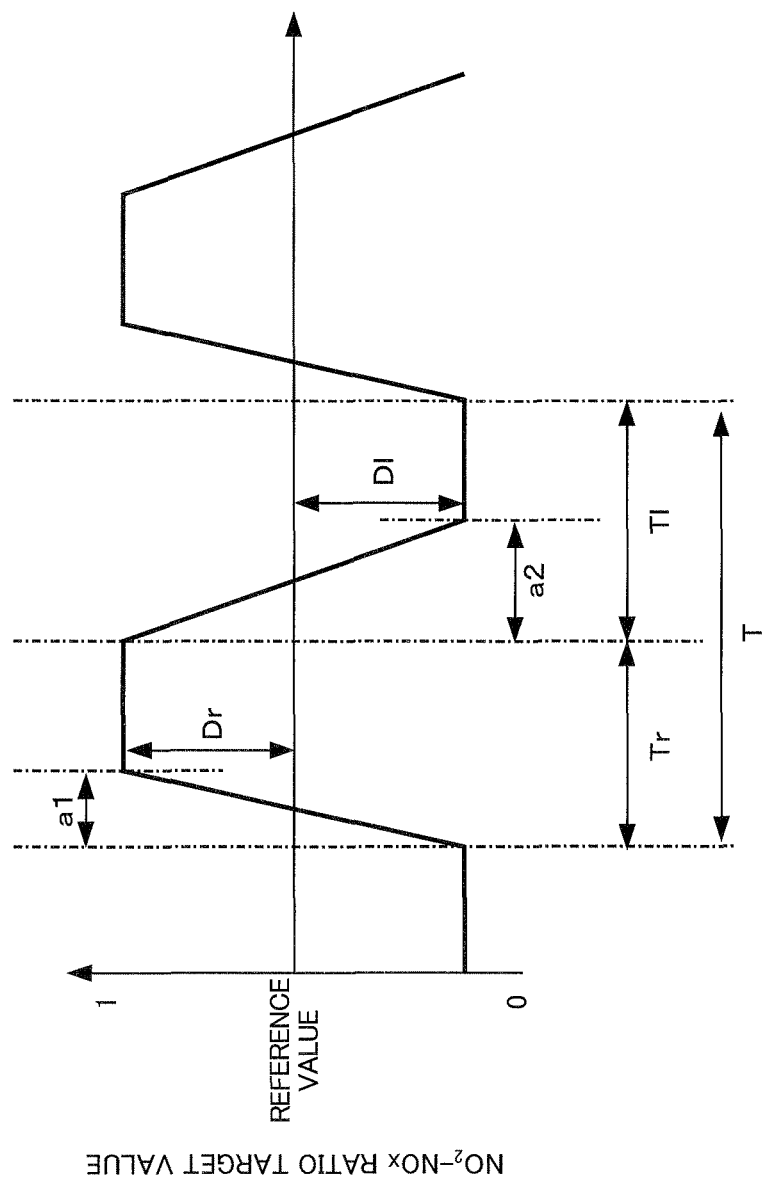
FIG. 14 is an illustration showing an example of the aspect of change in a target value of the $NO_2$—NOx ratio.

In addition, although the time to initiate $NO_2$ increase control or the time to initiate $NO_2$ decrease control is determined based on a comparison between the $NO_2$ storage amount and threshold in FIG. 13, it is not limited thereto, and the target value of the $NO_2$—NOx ratio may be changed based on an aspect established in advance as shown in FIG. 14.

FIG. 14 is an illustration showing an example of the aspect of change in the target value of the $NO_2$—NOx ratio. Such a waveform is characterized by the following seven types of waveform parameters, for example.

1. Reference Value
2. Period T of $NO_2$—NOx ratio perturbation control
3. Ratio of execution time Tl of $NO_2$ decrease control to execution time Tr of $NO_2$ increase control
4. Depth Dr to $NO_2$ excessive side (length from reference value to maximum value to $NO_2$ excessive side)
5. Depth Dl to NO excessive side (distance from reference value to maximum value to NO excessive side)
6. Slope during $NO_2$ increase (slope of section a1 in FIG. 14)
7. Slope during $NO_2$ decrease (slope of section a2 in FIG. 14)

The values of these waveform parameters are set as appropriate depending on the estimated $NO_2$ storage amount, $NO_2$ slip amount and NO slip amount, the output value of the $NO_2$ sensor, engine revolution speed, engine load, and the like. Hereinafter, the specific objectives thereof will be exemplarily listed.

The values of these waveform parameters are preferably set based on the estimated $NO_2$ storage amount and output value of the $NO_2$ sensor so that the $NO_2$ slip amount and NO slip amount are minimized, for example.

In addition, the values of these waveform parameters are preferably set based on parameters expressing the operating state of the engine such as the exhaust temperature and engine load, so that both the NO slip amount and $NO_2$ slip amount are minimized, or the fuel consumption is minimized, for example.

Above all, among the above-mentioned waveform parameters, the reference value, depth Dr to $NO_2$ excessive side and depth Dl to NO excessive side have a strong correlation with the NO slip amount and $NO_2$ slip amount, and thus are preferably set so that the NOx slip amount is minimized in every operating region of the engine. For example, in operating regions such as that in which $NO_2$ reduction components such as HC and CO abundantly flow into the selective reduction catalyst, the values of the reference value and depths Dr and Dl are preferably set so that $NO_2$ increase control is preferentially executed over $NO_2$ decrease control, as these $NO_2$ reduction components become abundant. In other words, it is preferable to correct the reference value to a value greater than 0.5, or to correct so that the proportion of the depth Dr to the $NO_2$ excessive side relative to the depth Dl to the NO excessive side increases as the $NO_2$ reduction components become abundant.

Figure 15:
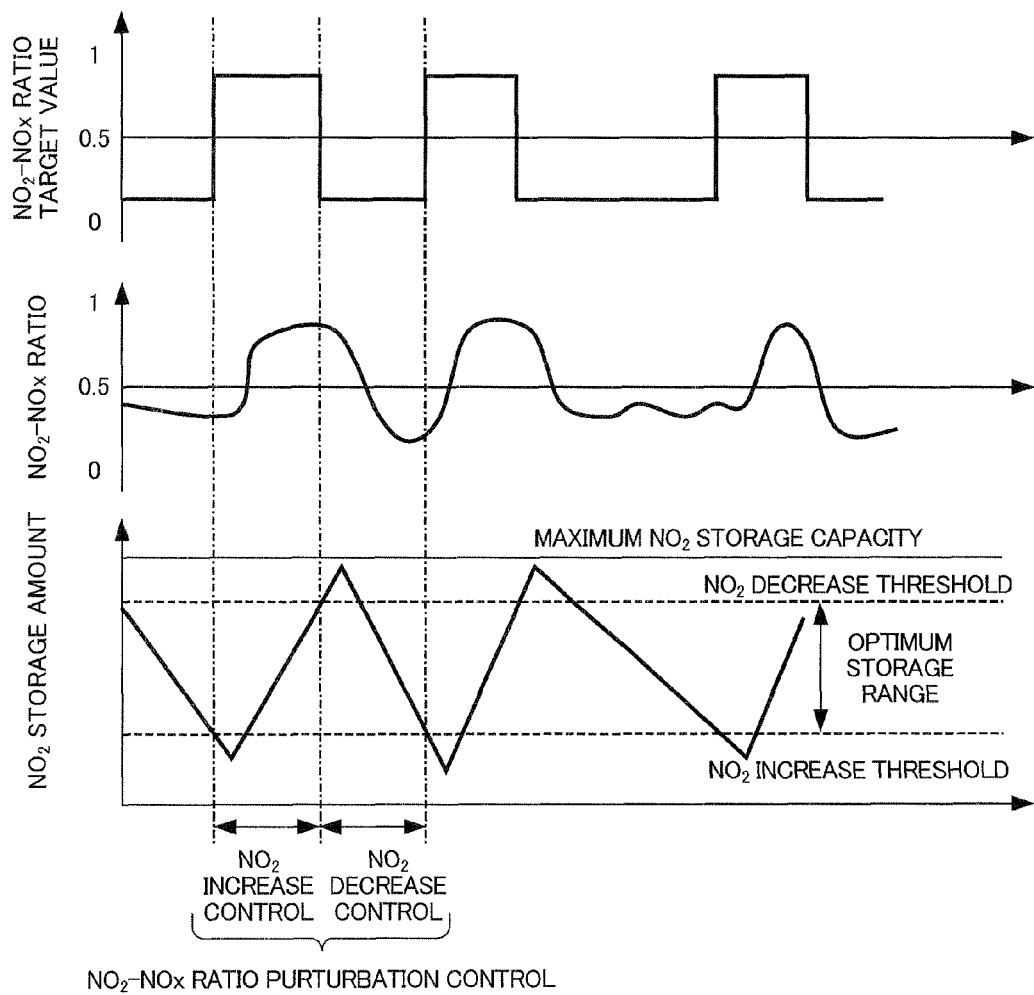
FIG. 15 provides time charts showing an example of operation of the perturbation controller according to the embodiment.

In addition, although a case of also changing the actual $NO_2$—NOx ratio in accordance with the change in target value is shown in the example shown in FIG. 13, the actual $NO_2$—NOx ratio is not limited to always changing naturally in this way. For example, as shown in FIG. 15, the change in the target value and the change in the actual $NO_2$—NOx ratio do not match; therefore, the $NO_2$ storage amount may greatly diverge from the optimum storage range.

By causing the target value of the $NO_2$ balance during the one period of $NO_2$—NOx ratio perturbation control to change from 0 in such a case, i.e. in the case of the $NO_2$ storage amount diverging from the optimum storage range, it is possible to maintain the $NO_2$ storage amount within the optimum storage range.

For example, in a case of the $NO_2$ storage amount being within the optimum storage range, it is preferable to set the target value of the $NO_2$ balance during one period to 0 or in the vicinity thereof as described above.

In contrast, in a case of the $NO_2$ storage amount being greater than the upper limit of the optimum storage range, the target value of the $NO_2$ balance during the one period is preferably set to negative so that the $NO_2$ storage amount decreases to fall within the optimum storage range.

In addition, in the case of the $NO_2$ storage amount being less than the lower limit of the optimum storage range, the target value of the $NO_2$ balance during the one period is preferably set to positive so that the $NO_2$ storage amount rises to fall within the optimum storage range.

Furthermore, although the target value of the $NO_2$—NOx ratio is made to change based on the estimated $NO_2$ storage amount in the example shown in FIG. 13, the present invention is not limited thereto. Moreover, the target value of the $NO_2$—NOx ratio may be set based on the estimated $NO_2$ slip amount or NO slip amount. In other words, it may be configured so that, upon the event of the NO slip amount becoming no more than a predetermined threshold, it is determined that the $NO_2$ storage amount has become no more than the $NO_2$ increase threshold, and the target value of the $NO_2$—NOx ratio is set to a value on the $NO_2$ excessive side, and upon the $NO_2$ slip amount becoming at least a predetermined threshold, it is determined that the $NO_2$ storage amount has become at least the $NO_2$ decrease threshold, and the target value of the $NO_2$—NOx ratio is set to a value on the NO excessive side.

In addition, although the target value of the $NO_2$—NOx ratio is made to change based on the estimated $NO_2$ storage amount in the example shown in FIG. 13, the present invention is not limited thereto. Moreover, the target value of the $NO_2$—NOx ratio may be set based on the output value of the $NO_2$ sensor.

However, although it can be determined that the $NO_2$ storage amount has become at least the $NO_2$ decrease threshold with only the $NO_2$ sensor, it is not possible to determine that the $NO_2$ storage amount has become no more than the $NO_2$ increase threshold therewith. In other words, although a suitable time to initiate $NO_2$ decrease control can be determined with only the $NO_2$ sensor, a suitable time to initiate $NO_2$ increase control thereafter cannot be determined therewith.

Therefore, in this case, it may be configured so that, upon the event of the output value of the $NO_2$ sensor becoming at least a predetermined value, it is determined that the $NO_2$ storage amount has become at least the $NO_2$ decrease threshold, and the target value of the $NO_2$—NOx ratio is set to the NO excessive side, after which, upon the event of a predetermined time having elapsed, it is determined that the $NO_2$ storage amount has become no more than the $NO_2$ maximum threshold, and the target value of the $NO_2$—NOx ratio is set to a value on the $NO_2$ excessive side.

It should be noted that, for the $NO_2$—NOx ratio perturbation controller 6 configured in the above way, the target value of the $NO_2$—NOx ratio, target value of the $NO_2$ balance, waveform parameters, etc. are included in the control parameters related to execution of $NO_2$—NOx ratio perturbation control.

Referring back to FIG. 5, a $NO_2$—NOx ratio upper limit setting unit 62 and a $NO_2$—NOx ratio lower limit setting unit 63 that respectively set the upper limit and lower limit for the $NO_2$—NOx ratio are connected to the main controller 7, in addition to the aforementioned such perturbation controller 6.

The $NO_2$—NOx ratio upper limit setting unit 62 sets the upper limit of the $NO_2$—NOx ratio based on parameters representing the operating state of the engine such as the engine revolution speed and engine load.

The $NO_2$—NOx ratio lower limit setting unit 63 sets the lower limit of the $NO_2$—NOx ratio based on parameters representing the operating state of the engine such as the engine revolution speed and engine load.

Main Controller 7

Referring back to FIG. 5, the main controller 7 decides the command values for the $NO_2$—NOx ratio adjustment mechanism 8 (EGR valve command value, target air-fuel ratio, oxidation catalyst target temperature, etc.) based on the target value of the $NO_2$—NOx ratio decided by the perturbation controller 6, the upper limit of the $NO_2$—NOx ratio set by the upper limit setting unit 62, and the lower limit of the $NO_2$—NOx ratio set by the lower limit setting unit 63. The $NO_2$—NOx ratio adjustment mechanism 8 operates in response to the command values decided by the main controller 7, and causes the $NO_2$—NOx ratio of the exhaust flowing into the selective reduction catalyst to change as necessary.

Figure 16:
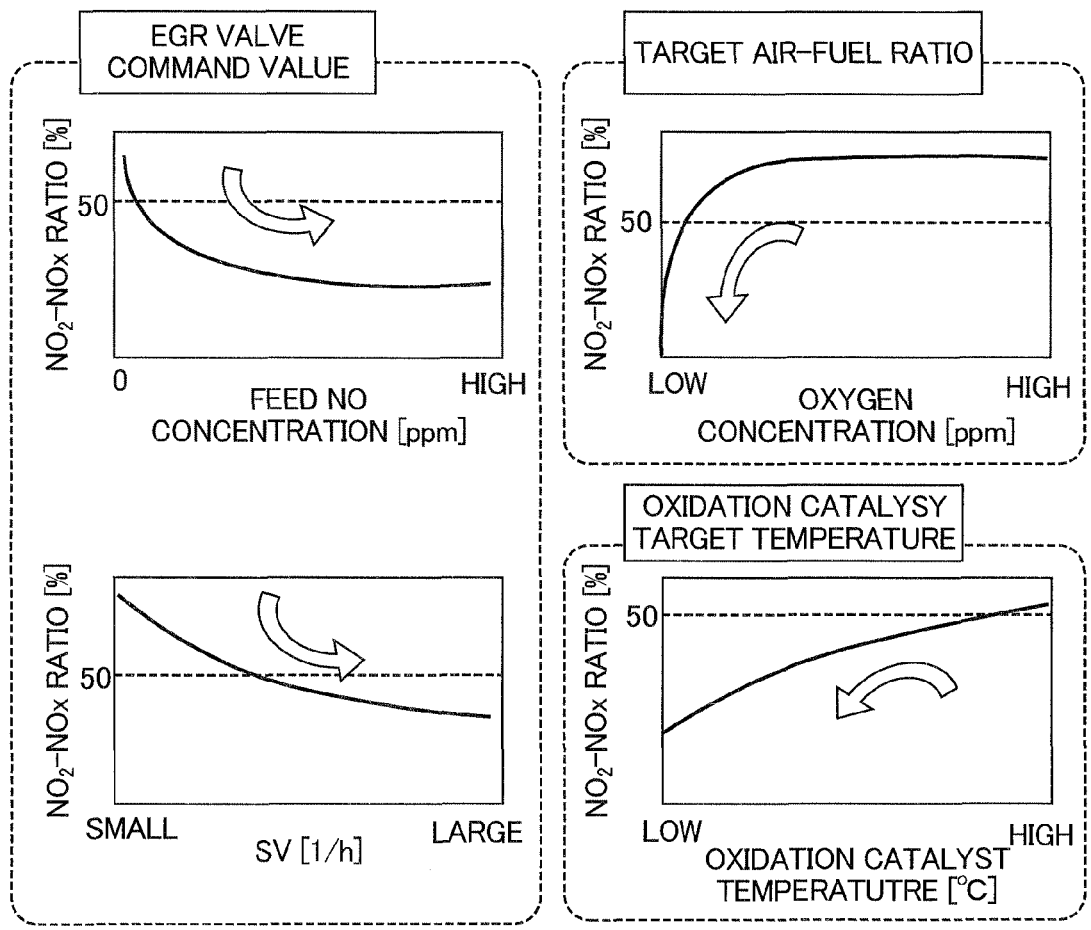
FIG. 16 provides graphs showing relationships between the $NO_2$—NOx ratio and four parameters that cause the $NO_2$—NOx ratio to change directly.

FIG. 16 provides graphs showing relationships between the $NO_2$—NOx ratio and four parameters that cause the $NO_2$—NOx ratio to change directly (feed NO concentration (top left), SV (lower left), oxygen concentration (upper right), and oxidation catalyst temperature (lower right)).

Although it does not mean that the EGR valve command value, target air-fuel mixture and oxidation catalyst target temperature decided by the main controller 7 and these four parameters are uniquely associated, the EGR valve command value has a strong correlation with the feed NO concentration and SV, the target air-fuel ratio has a strong correlation with the oxygen concentration of the exhaust, and the oxidation catalyst target temperature has a strong correlation with the oxidation catalyst temperature. In other words, the feed NO concentration and SV mainly change when the EGR valve command value is made to change, the oxygen concentration mainly changes when the target air-fuel ratio is made to change, and the oxidation catalyst temperature mainly changes when the oxidation catalyst target temperature is made to change.

As shown in FIG. 16, when the feed NO concentration rises, the $NO_2$—NOx ratio flowing into the selective reduction catalyst declines since the NO oxidation efficiency of the oxidation catalyst and CSF declines. When the SV increases, the $NO_2$—NOx ratio declines since the NO oxidation efficiency of the oxidation catalyst and CSF declines. When the oxygen concentration decreases, the $NO_2$—NOx ratio declines since the NO oxidation efficiency of the oxidation catalyst and CSF declines. In addition, when the oxidation catalyst temperature decreases, the $NO_2$—NOx ratio declines since the NO oxidation efficiency of the oxidation catalyst and CSF declines.

Furthermore, as shown in FIG. 16, the $NO_2$—NOx ratio has substantially linear relationships with the oxidation catalyst temperature and SV over the entire region. However, the $NO_2$—NOx ratio changes greatly relative to the feed NO concentration in the lower concentration region; whereas, it does not change very much in the high concentration region. In addition, the $NO_2$—NOx ratio does not change very much relative to the oxygen concentration in the high concentration region; whereas, it changes greatly in the low concentration region. Upon taking account of the aspect of the extent of change in the $NO_2$—NOx ratio differing in every region of the respective parameters as described above, the main controller 7 decides the command values for the $NO_2$—NOx ratio adjustment mechanism, so that the $NO_2$—NOx ratio changes following a request from the perturbation controller 6.

Next, the effects of the $NO_2$—NOx ratio perturbation control will be explained.

Figure 17:
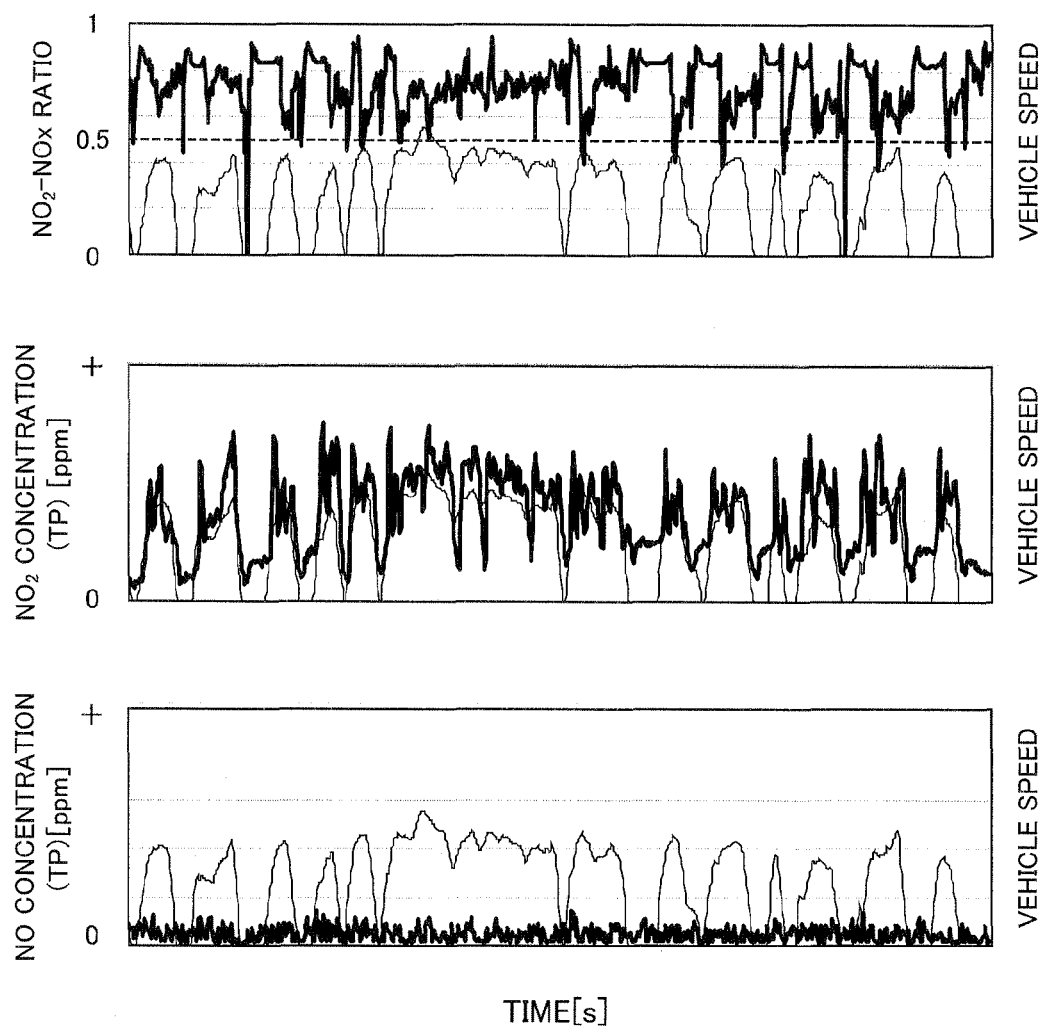
FIG. 17 provides graphs showing tests results for a comparative example.

FIG. 17 provides graphs showing test results for a comparative example in which $NO_2$—NOx ratio perturbation control is not executed, more specifically, a case of controlling the $NO_2$—NOx ratio adjustment mechanism so that the temperature of the selective reduction catalyst is kept at 250° C.

Figure 18:
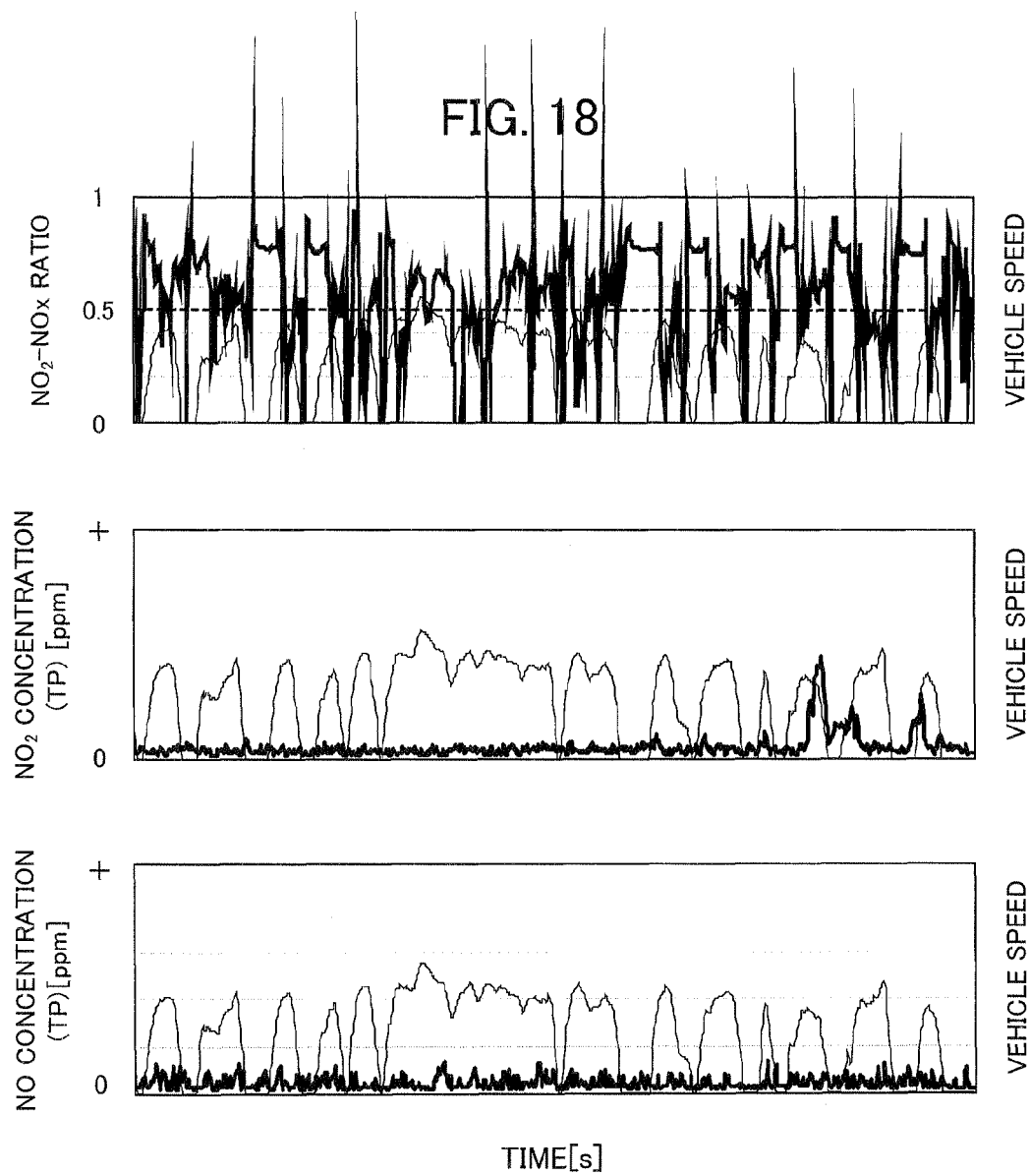
FIG. 18 provides graphs showing test results in a case of executing $NO_2$—NOx ratio perturbation control according to the embodiment.

FIG. 18 provides graphs showing test results in a case of executing $NO_2$—NOx ratio perturbation control. It should be noted that FIGS. 17 and 18 show, in order from the top, the $NO_2$—NOx ratio of exhaust flowing into the selective reduction catalyst, and the $NO_2$ concentration and NO concentration of exhaust discharged from the tailpipe. In addition, for reference, the vehicle speeds shown in the figures are the same.

As shown in FIG. 17, the $NO_2$—NOx ratio in the comparative example transitions more to the $NO_2$ excessive side than 0.5; therefore, the $NO_2$ storage amount of the selective reduction catalyst is always in a saturated state. As a result, although the purification rate for NO is maintained to be high, the purification rate for $NO_2$ is low.

In contrast, as shown in FIG. 18, when $NO_2$—NOx ratio perturbation control is executed so that the $NO_2$ balance in a predetermined period is 0, the $NO_2$—NOx ratio alternately changes to the $NO_2$ excessive side or NO excessive side while straddling 0.5. Since the $NO_2$ storage amount of the selective reduction catalyst is thereby maintained within the optimum storage range, the purification rates for both NO and $NO_2$ come to be maintained to be high.

However, due to using an oxidation catalyst and CSF having high NO oxidation performance in the above-mentioned tests, the $NO_2$—NOx ratio of the comparative example shown in FIG. 17 transitions to the $NO_2$ excessive side that is greater than 0.5. This in other words means that the $NO_2$ purification rate can be improved to some extent without having executed $NO_2$—NOx ratio perturbation control, by making the NO oxidation performance of the oxidation catalyst and CSF decline. However, if the NO oxidation performance of the oxidation catalyst and CSF is made to decline, the warm-up performance of the exhaust system when initiating engine startup will also decline in addition to the oxidation performance for CO and HC. Therefore, if considering the aforementioned such situation, the CO and HC purification rates as well as the warm-up performance can be increased while increasing the NOx purification rate by the selective reduction catalyst, by way of executing the $NO_2$—NOx ratio perturbation control of the present invention.

Figure 19:
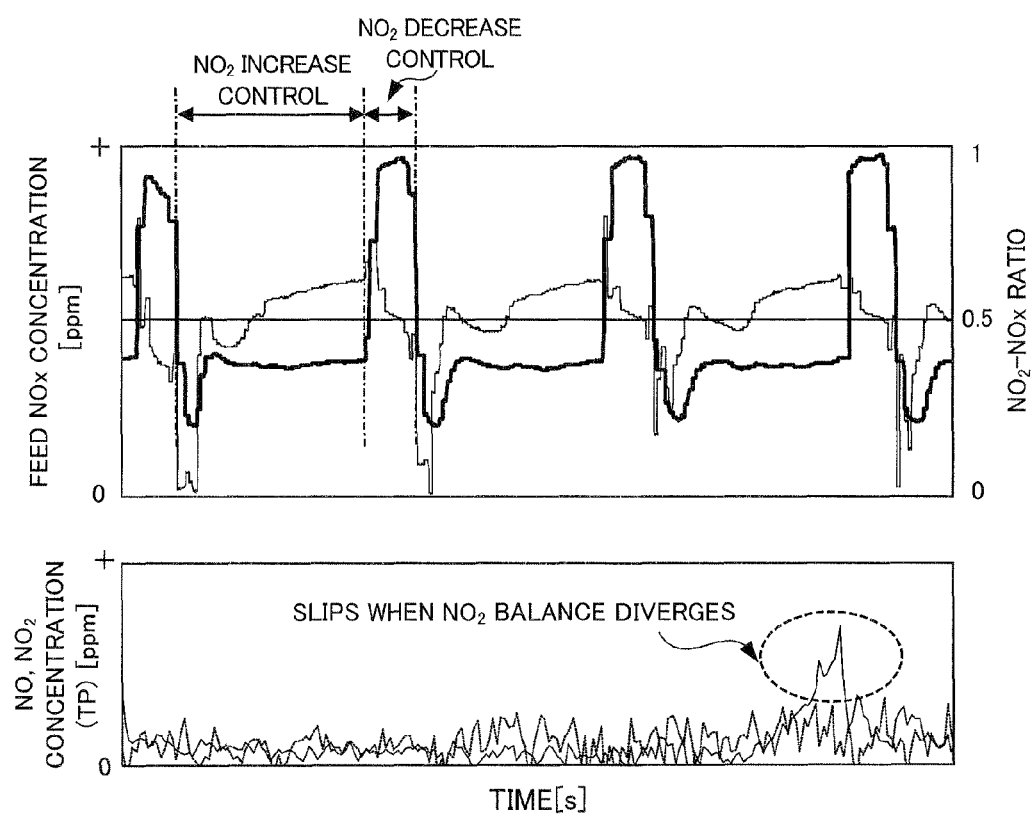
FIG. 19 provides graphs showing the change in the actual $NO_2$—NOx ratio, feed NOx amount, $NO_2$ concentration and NO concentration when executing $NO_2$—NOx ratio perturbation control according to the embodiment.

FIG. 19 provides graphs showing the change in the actual $NO_2$—NOx ratio (fine line in top graph), NOx amount discharged from the engine (thick line in top graph), $NO_2$ concentration of exhaust discharged from the tail pipe (solid line), and NO concentration (dotted line) when executing $NO_2$—NOx ratio perturbation control. It should be noted that, this control example shown in FIG. 19 shows a case of changing the EGR valve command value (hereinafter referred to as "EGR adjustment method") in particular among the command values for the above-mentioned $NO_2$—NOx ratio adjustment mechanism, in order to cause the $NO_2$—NOx ratio to change in response to a request from the $NO_2$—NOx ratio perturbation controller.

When executing the $NO_2$—NOx ratio perturbation control by way of the EGR adjustment method, the feed NOx concentration and SV are made to decline by decreasing the EGR amount while executing $NO_2$ increase control. The NO oxidation efficiency of the oxidation catalyst and CSF thereby rises, and the $NO_2$—NOx ratio increases. In addition, the feed NOx concentration and SV are made to rise by increasing the EGR amount while executing $NO_2$ decrease control. The NO oxidation efficiency of the oxidation catalyst and CSF thereby declines, and the $NO_2$—NOx ratio declines.

By causing the $NO_2$—NOx ratio to alternately change to the $NO_2$ excessive side or NO excessive side straddling 0.5 in this way, both the $NO_2$ purification rate and NO purification rate can be made to decline to the same extent. It should be noted that, when the $NO_2$ balance does not match the target value and the $NO_2$ storage amount diverges from the optimum storage range, $NO_2$ or NO slips, as shown by the dotted line in FIG. 19.

Next, periods suited to execution of the aforementioned such $NO_2$—NOx ratio perturbation control and periods not suited thereto will be considered. First, by executing $NO_2$—NOx ratio perturbation control, it is possible to continuously maintain the NOx purification rate of the selective reduction catalyst to steadily be high without continuously maintaining the $NO_2$—NOx ratio at the optimum value; therefore, in a case of the engine being in a steady operating state in particular, it is preferably to continually execute perturbation control.

However, in a case of the engine being in an acceleration operating state, it is preferable to temporarily interrupt execution of $NO_2$—NOx ratio perturbation control. This is because, when the engine is in an acceleration operating state, the NOx amount and exhaust volume discharged from the engine increases due to the intake air being controlled to the increasing side and the $NO_2$—NOx ratio and the FGR amount being controlled to the decreasing side, and there is a tendency for the $NO_2$—NOx ratio to decline without having executed perturbation control. In addition, when executing perturbation control in such a period, in a case of a request for acceleration from the operator and a request from perturbation control interfering, for example, in a case of a decrease in the $NO_2$—NOx ratio is further request from perturbation control in a state in which acceleration is being requested by the operator, there is also concern over the $NO_2$—NOx ratio greatly declining more than necessary, and the $NO_2$ storage rate of the selective reduction catalyst diverging from the optimum storage range (refer to FIG. 8). Therefore, the necessity for executing perturbation control in such a period is considered low. Furthermore, in a case of the engine being in an acceleration operating state, it is preferable to temporarily interrupt execution of $NO_2$—NOx ratio perturbation control also from the viewpoint of simplification of the control block.

Furthermore, in a case of the oxidation catalyst and CSF not reaching activation such as immediately after initiating startup of the engine, for example, the NO oxidation efficiency of this oxidation block is low; therefore, upon executing $NO_2$—NOx ratio perturbation control, it is considered not possible to cause the $NO_2$—NOx ratio of the exhaust flowing into the selective reduction catalyst to change in accordance with the request. In addition, in a case of this oxidation block not having reached activation, it is considered to be a state in which not only the NO oxidation efficiency declines, but also the CO and HC oxidation efficiency declines, and the engine is in warm up; therefore, there is concern over the purification efficiency other than for NOx, such as HC and CO, and the fuel economy also deteriorating if executing perturbation control in such a period. Based on the above, in a case in which the oxidation catalyst and CSF have not reached activation, along with inhibiting execution of $NO_2$—NOx ratio perturbation control, it is preferable to prioritize warm up control of this oxidation block to make the CO and HC purification performance quickly improve, so as to be able to quickly initiate $NO_2$—NOx ratio perturbation control.

Herein, the challenges of conventional control that continuously maintains the $NO_2$—NOx ratio of the exhaust flowing into the selective reduction catalyst at the optimum value (e.g., 0.5) will be considered.

As described above, continuously maintaining the $NO_2$—NOx ratio at the optimum value is difficult in actual practice; therefore, the $NO_2$—NOx ratio may temporarily diverge from the optimum value. Therefore, after a $NO_2$ excessive (e.g., 0.6) state has temporarily continued, conditions causing to return to the optimum value are assumed.

While returning to such a $NO_2$—NOx ratio, the conventional control causes the $NO_2$—NOx ratio to decrease towards the optimum value without allowing undershooting to a NO excessive state as much as possible. However, when focusing on the $NO_2$ adsorption function of the selective reduction catalyst, so long as the $NO_2$ excessive state temporarily continues as mentioned above, the $NO_2$ storage rate of the selective reduction catalyst will increase, and the robustness to changing to this $NO_2$ excessive side is considered to decrease. In addition, upon causing the $NO_2$—NOx ratio to decrease from this state towards the optimum value as in the conventional control, the release of the $NO_2$ adsorbed is not promoted; therefore, the selective reduction catalyst will not change to be in a state of low robustness to change to the $NO_2$ excessive side, even if the $NO_2$—NOx ratio is controlled to the optimum value. Therefore, after the return of the $NO_2$—NOx ratio to the optimum value, even in a case of the $NO_2$—NOx ratio only slightly deflecting to the $NO_2$ excessive side for any reason, this surplus of $NO_2$ will immediately slip.

In contrast, with the $NO_2$—NOx ratio perturbation control of the present invention, the $NO_2$—NOx ratio is intentionally made to undershoot relative to the above-mentioned optimum value so that the $NO_2$ balance is the target value (e.g., 0). Therefore, the selective reduction catalyst is maintained in a state of high robustness to change to the $NO_2$ excessive side or NO excessive side.

Second Embodiment

Next, a second embodiment of the present invention will be explained while referring to the drawings. It should be noted that, in the following explanation, the same symbols are assigned for similar configurations to the first embodiment, and explanations thereof will be omitted.

In the selective reduction catalyst containing zeolite as described above, a function of adsorbing HC is also possessed in addition to the function of adsorbing $NO_2$. In addition, the HC adsorbed to the selective reduction catalyst reduces $NO_2$, which is the main factor making the NOx purification rate and $NO_2$ storage amount of the selective reduction catalyst vary. The present embodiment differs from the above-mentioned first embodiment in the aspect of accounting for such adsorption of HC on the selective reduction catalyst.

Figure 20:
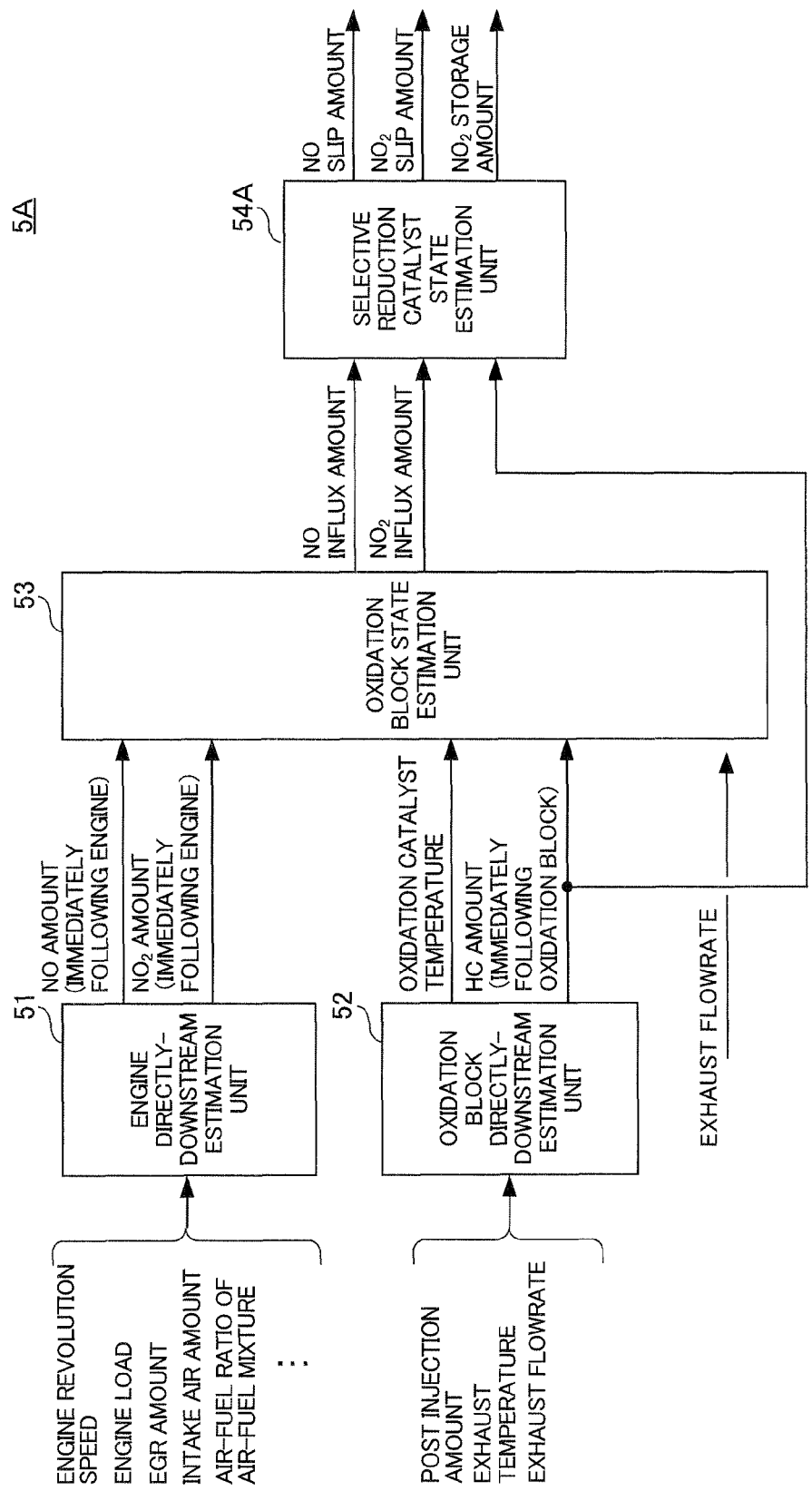
FIG. 20 is a block diagram showing the configuration of a catalyst parameter estimation device according to a second embodiment of the present invention.

FIG. 20 is a block diagram showing the configuration of a catalyst parameter estimation device 5A.

In the present embodiment, the configuration of a selective reduction catalyst state estimation unit 54A of the catalyst parameter estimation device 5A differs from the first embodiment. As shown in FIG. 20, the selective reduction catalyst state estimation unit 54A estimates the $NO_2$ storage amount of the selective reduction catalyst, and NO amount (or NO concentration) and $NO_2$ amount (or $NO_2$ concentration) of the exhaust immediately following the selective reduction catalyst, based on the NO influx amount and $NO_2$ influx amount estimated in the oxidation block direct-downstream estimation unit 53, as well as the HC amount (hereinafter referred to as "HC influx amount") estimated in the engine direct-downstream estimation unit 51.

Figure 21:
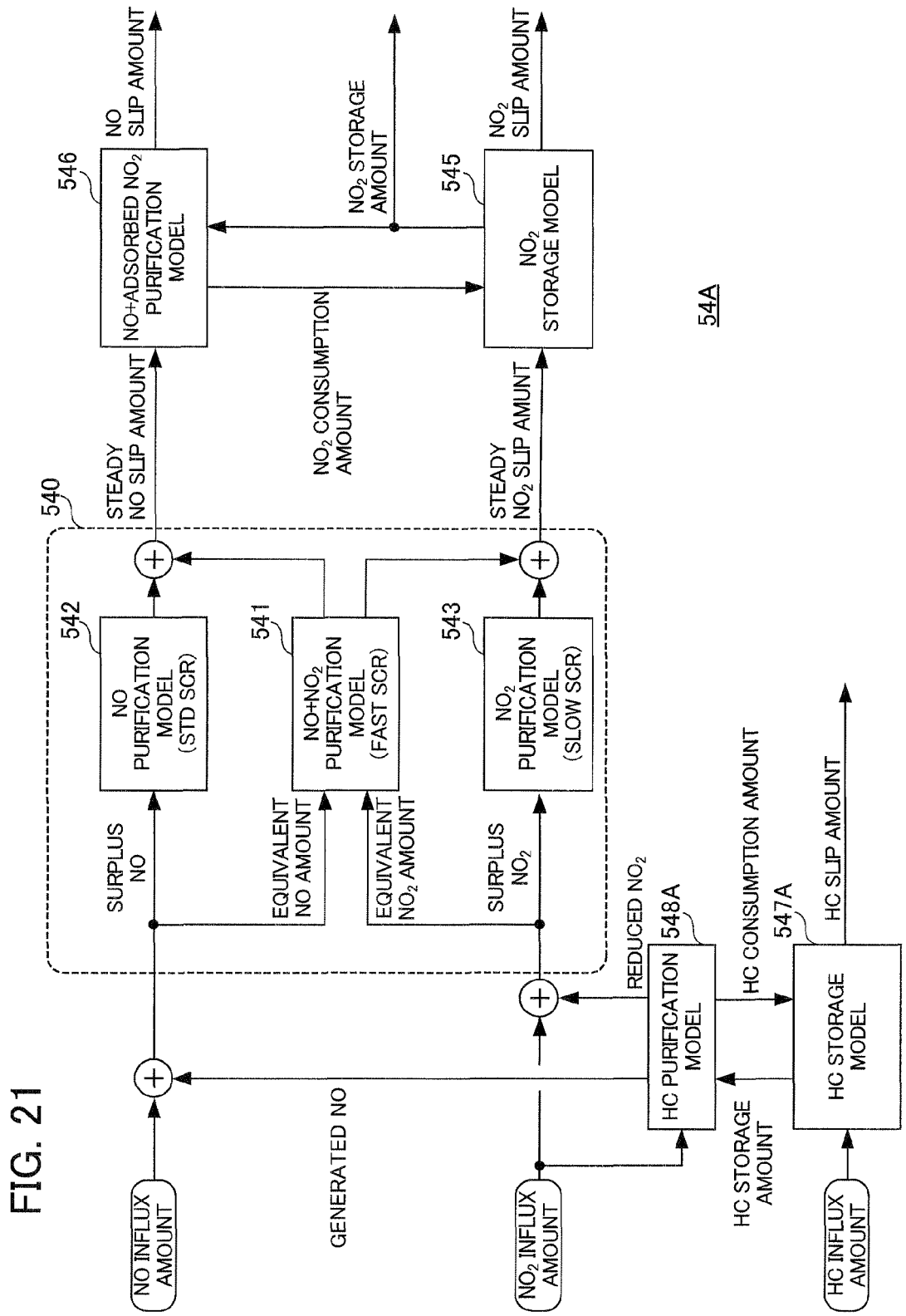
FIG. 21 is a block diagram showing the configuration of a selective reduction catalyst state estimation unit according to the embodiment.

FIG. 21 is a block diagram showing the configuration of the selective reduction catalyst state estimation unit 54A.

This selective reduction catalyst state estimation unit 54A is configured to include the steady slip amount operation part 540, the $NO_2$ storage model operation part 545, the NO+adsorbed $NO_2$ purification model operation part 546, an HC storage model operation part 547A, and an HC purification model operation part 548A.

The HC storage model operation part 547A estimates a HC storage amount corresponding to an HC adsorbed amount of the selective reduction catalyst, and an HC slip amount corresponding to an HC amount discharged from the selective reduction catalyst.

The HC purification model operation part 548A estimates an HC consumption amount corresponding to an HC amount, among that adsorbed to the selective reduction catalyst, oxidized by reducing $NO_2$ having newly flowed thereinto, a reduced $NO_2$ amount corresponding to an amount of $NO_2$ reduced in this reaction, and a generated NO amount corresponding to an amount of NO newly generated by way of reducing $NO_2$ in this reaction.

The HC storage model operation part 547A sets the HC amount newly adsorbed to the selective reduction catalyst among the HC influx amount estimated in the engine direct-downstream estimation unit 51 (new HC adsorption amount) to positive, sets the HC consumption amount estimated in the above-mentioned HC purification model operation part 548A to negative, and defines a value arrived at by adding this new HC adsorption amount and HC consumption amount as the HC storage amount.

Herein, the new HC adsorption amount is calculated by multiplying the HC adsorption efficiency decided by searching a predetermined map, by the HC influx amount. It should be noted that, since the map deciding this HC adsorption efficiency is the same configuration as the map deciding the aforementioned $NO_2$ adsorption efficiency (refer to FIG. 10), an illustration thereof is omitted. In other words, the HC adsorption function of the selective reduction catalyst declines accompanying the HC storage amount increasing. In addition, the HC slip amount is calculated by subtracting the above-mentioned new HC adsorption amount from the HC influx amount.

The HC purification model operation unit 548A calculates the reduced $NO_2$ amount, generated NO amount and HC consumption amount by searching maps established in advance, under the assumption that the reduction reaction of $NO_2$ shown in the following formula (2) progresses between the HC adsorbed to the selective reduction catalyst and the NO₂ newly flowing thereinto.

$$HC + NO_2 \rightarrow CO + NO \quad (2)$$

A value arrived at by adding the above-mentioned generated NO amount to the NO influx amount estimated in the oxidation block direct-downstream estimation unit 53, and a value arrived at by subtracting the above-mentioned reduced NO₂ amount from the NO₂ influx amount estimated in the oxidation block direct-downstream estimation unit 53 are inputted to the steady slip amount operation part 540.

It should be noted that the present invention is not limited to the aforementioned embodiments, and various modifications thereto are possible.

For example, although the above-mentioned embodiment is configured so that the NO amount (or NO concentration) and NO₂ amount (or NO₂ concentration) of the exhaust immediately following the engine, immediately following the oxidation block and immediately following the selective reduction catalyst are respectively estimated in the engine direct-downstream estimation unit 51, oxidation block direct-downstream estimation unit 53 and selective reduction catalyst direct-downstream estimation unit 54, the present invention is not limited thereto. In place of this NO amount and NO₂ amount, it may be configured so as to estimate a NOx amount (or NOx concentration) equivalent to these and a NO₂—NOx ratio.

In addition, although the optimum storage range for the NO₂ storage rate is set to 30 to 70% in the above-mentioned embodiments, the present invention is not limited thereto. In a case of the NO₂ storage rate being at 50%, there is the same extent of surplus for both the NO₂ adsorption side and release side; therefore, since the robustness to change to both the NO₂ excessive side and NO excessive side are considered to be highest, the above-mentioned optimum storage range may be limited to a narrower range centered around 50% (e.g., 40 to 60%).

What is claimed is:

1. An exhaust purification system for an internal combustion engine, the system comprising:
    a NOx selective reduction catalyst provided in an exhaust channel of the internal combustion engine, and having a function of selectively reducing NOx in exhaust under the presence of a reducing agent, and adsorbing NO₂ in the exhaust;
    a reducing agent supply device provided on an upstream side of the NOx selective reduction catalyst, and supplying a reducing agent or a precursor thereof into the exhaust channel on the upstream side of the NOx selective reduction catalyst;
    a NO₂—NOx ratio adjustment mechanism provided on the upstream side of the NOx selective reduction catalyst, and causing a NO₂—NOx ratio corresponding to a ratio of NO₂ to NOx in exhaust flowing into the NOx selective reduction catalyst to change; and
    a perturbation control unit configured to execute NO₂—NOx ratio perturbation control, which is control that alternately executes NO₂ increase control to cause the NO₂—NOx ratio to be greater than a reference value in a range of at least 0.4 to less than 0.7 by way of the NO₂—NOx ratio adjustment mechanism, and NO₂ decrease control to cause the NO₂—NOx ratio to be less than the reference value by way of the NO₂—NOx ratio adjustment mechanism,
    wherein the NO₂—NOx ratio perturbation control is executed so that a NO₂ balance of the NOx selective reduction catalyst in a predetermined time period, with NO₂ adsorption being positive and NO₂ release being negative, is a target value.

2. An exhaust purification system for an internal combustion engine according to claim 1, wherein the perturbation control unit interrupts execution of the NO₂—NOx ratio perturbation control in a case of the internal combustion engine being in an acceleration operating state.

3. An exhaust purification system for an internal combustion engine according to claim 1, further comprising an oxidation catalyst provided in the exhaust channel on an upstream side of the NOx selective reduction catalyst,
    wherein the perturbation control unit inhibits execution of the NO₂—NOx ratio perturbation control in a case of the oxidation catalyst not having reached activation.

4. An exhaust purification system for an internal combustion engine according to claim 1, wherein the NOx selective reduction catalyst contains zeolite having a function of adsorbing NO₂ and a function of adsorbing HO.

5. An exhaust purification system for an internal combustion engine according to claim 1, further comprising a NO₂ adsorption amount estimation unit configured to estimate a NO₂ adsorption amount of the NOx selective reduction catalyst,
    wherein the perturbation control unit sets a value of a control parameter related to execution of the NO₂—NOx ratio perturbation control based on the NO₂ adsorption amount.

6. An exhaust purification system for an internal combustion engine according to claim 5, wherein the perturbation control unit sets a target value for the NO₂ balance so that the NO₂ adsorption amount is maintained within a NOx slip suppression range established between a predetermined upper limit and lower limit,
    wherein NO₂ slip occurs when supplying NO₂ excessive exhaust in a state in which the NO₂ adsorption amount is greater than the upper limit, and
    wherein NO slip occurs when supplying NO excessive exhaust in a state in which the NO₂ adsorption amount is less than the lower limit.

7. An exhaust purification system for an internal combustion engine according to claim 6,
    wherein the perturbation control unit:
    sets a target value of the NO₂ balance to 0 in a case of the NO₂ adsorption amount being within the NOx suppression slip range;
    sets the target value of the NO₂ balance to negative so that the NO₂ adsorption amount decreases in a case of the NO₂ adsorption amount being greater than an upper limit of the NOx slip suppression range; and
    sets the target value of the NO₂ balance to positive so that the NO₂ adsorption amount increases in a case of the NO₂ adsorption amount being less than a lower limit of the NOx slip suppression range.

8. An exhaust purification system for an internal combustion engine according to claim 7, wherein the perturbation control unit sets the value of the control parameter so that an absolute value of a difference between a maximum value of the NO₂—NOx ratio during execution of the NO₂ increase control and the reference value becomes larger than an absolute value of a difference between the NO₂—NOx ratio during execution of the NO₂ reduction control and the reference value with an increase in an amount of a NO₂ reduction component discharged from the internal combustion engine and flowing into the NOx selective reduction catalyst.

9. An exhaust purification system for an internal combustion engine according to claim 7, wherein the perturbation control unit corrects a reference value for the $NO_2$—NOx ratio to a larger value with an increase in an amount of a $NO_2$ reduction component discharged from the internal combustion engine and flowing into the NOx selective reduction catalyst.

10. An exhaust purification system for an internal combustion engine according to claim 1, further comprising a $NO_2$ detection device provided on a downstream side of the NOx selective reduction catalyst, and detecting a $NO_2$ concentration of exhaust on a downstream side of the NOx selective reduction catalyst, wherein the perturbation control unit sets a value of a control parameter related to execution of the $NO_2$—NOx ratio perturbation control based on an output value of the $NO_2$ detection device.

11. An exhaust purification system for an internal combustion engine according to claim 10, further comprising:

a NOx detection device provided on the downstream side of the NOx selective reduction catalyst, and detecting a NOx concentration of exhaust on the downstream side of the NOx selective reduction catalyst; and a $NO_2$ adsorption amount estimation unit configured to estimate a $NO_2$ adsorption amount of the NOx selective reduction catalyst based on the output value of the $NO_2$ detection device and an output value of the NOx detection device, wherein the perturbation control unit sets a value of the control parameter based on the $NO_2$ adsorption amount.

12. An exhaust purification system for an internal combustion engine according to claim 11, wherein the perturbation control unit sets a target value for the $NO_2$ balance so that the $NO_2$ adsorption amount is maintained within a NOx slip suppression range established between a predetermined upper limit and lower limit, wherein $NO_2$ slip occurs when supplying $NO_2$ excessive exhaust in a state in which the $NO_2$ adsorption amount is greater than the upper limit, and wherein NO slip occurs when supplying NO excessive exhaust in a state in which the $NO_2$ adsorption amount is less than the lower limit.

13. An exhaust purification system for an internal combustion engine according to claim 12, wherein the perturbation control unit:

sets a target value of the $NO_2$ balance to 0 in a case of the $NO_2$ adsorption amount being within the NOx suppression slip range;

sets the target value of the $NO_2$ balance to negative so that the $NO_2$ adsorption amount decreases in a case of the $NO_2$ adsorption amount being greater than an upper limit of the NOx slip suppression range; and sets the target value of the $NO_2$ balance to positive so that the $NO_2$ adsorption amount increases in a case of the $NO_2$ adsorption amount being less than a lower limit of the NOx slip suppression range.

14. An exhaust purification system for an internal combustion engine according to claim 13, wherein the perturbation control unit sets the value of the control parameter so that an absolute value of a difference between a maximum value of the $NO_2$—NOx ratio during execution of the $NO_2$ increase control and the reference value becomes larger than an absolute value of a difference between the $NO_2$—NOx ratio during execution of the $NO_2$ reduction control and the reference value with an increase in an amount of a $NO_2$ reduction component discharged from the internal combustion engine and flowing into the NOx selective reduction catalyst.

15. An exhaust purification system for an internal combustion engine according to claim 13, wherein the perturbation control unit corrects a reference value for the $NO_2$—NOx ratio to a larger value with an increase in an amount of a $NO_2$ reduction component discharged from the internal combustion engine and flowing into the NOx selective reduction catalyst.

* * * * *